US012777378B2

(12) United States Patent
Wang et al.

(10) Patent No.: US 12,777,378 B2
(45) Date of Patent: Oct. 27, 2026

(54) METHOD FOR HANDOVER KEY MANAGEMENT WITH NEXT GENERATION NETWORKS AND A SYSTEM THEREOF

(71) Applicant: InterDigital Patent Holdings, Inc., Wilmington, DE (US)

(72) Inventors: Zhibi Wang, Woodridge, IL (US); Samir Ferdi, Kirkland (CA); Taimoor Abbas, Sainte-Julie (CA); Rocco Di Girolamo, Laval (CA); Mohamad Kenan Al-Hares, Canterbury (GB); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 186 days.

(21) Appl. No.: 18/758,419

(22) Filed: Jun. 28, 2024

(65) Prior Publication Data

US 2026/0006500 A1 Jan. 1, 2026

(51) Int. Cl.

*H04W 36/00* (2009.01)
*H04W 12/043* (2021.01)
*H04W 76/20* (2018.01)

(52) U.S. Cl.

CPC ..... *H04W 36/0038* (2013.01); *H04W 12/043* (2021.01); *H04W 36/008355* (2023.05); *H04W 76/20* (2018.02)

(58) Field of Classification Search

CPC ............. H04W 36/0038; H04W 76/20; H04W 12/043; H04W 36/008355
See application file for complete search history.

(56) References Cited

U.S. PATENT DOCUMENTS

| | | | | |
|---|---|---|---|---|
| 12,127,047 | B2 * | 10/2024 | Lee | H04W 12/041 |
| 2019/0182211 | A1 * | 6/2019 | Yang | H04L 69/326 |
| 2025/0344057 | A1 * | 11/2025 | Ferdi | H04W 12/0431 |

FOREIGN PATENT DOCUMENTS

| | | |
|---|---|---|
| EP | 3576446 B1 | 3/2021 |
| EP | 4221082 A2 | 8/2023 |
| WO | 2023/158781 | 8/2023 |

OTHER PUBLICATIONS

Aboba et al., "Extensible Authentication Protocol (EAP)," Network Working Group, Request for Comments: 3748 (Jun. 2004).

(Continued)

*Primary Examiner* — Duc C Ho
(74) *Attorney, Agent, or Firm* — Volpe Koenig

(57) ABSTRACT

Methods and apparatuses for handover key management are provided according to one or more embodiments. A wireless transmit/receive unit (WTRU) may be handed over from a source base station to a target base station. The source base station may request a handover to a WTRU context management function (UCF). The UCF may generate a freshness parameter associated with the target base station. The UCF may utilize the freshness parameter to generate one or more access stratum (AS) keys. The freshness parameter may be provided to the WTRU by the UCF via the source base station. The WTRU may also utilize the freshness parameter to generate the one or more AS keys. The one or more AS keys may be securely shared with the target base station. The one or more AS keys may be utilized for securing an AS communication between the WTRU and the target base station.

20 Claims, 17 Drawing Sheets

(56) References Cited

OTHER PUBLICATIONS

Huang et al., "A Secure and Efficient Handover Authentication and Key Management Protocol for 5G Networks," Journal of Communications and Information Networks, vol. 5, No. 1 (Mar. 2020).
Third Generation Partnership Project, "Technical Specification Group Services and System Aspects; System Architecture for the 5G System; Stage 2 (Release 18)," 3GPP TS 23.501 V18.5.0 (Mar. 2024).
Third Generation Partnership Project, "Technical Specification Group Services and System Aspects; System architecture for the 5G System (5GS); Stage 2 (Release 19)," 3GPP TS 23.501 V19.0.0 (Jun. 2024).
Third Generation Partnership Project, "Technical Specification Group Services and System Aspects; Security architecture and procedures for 5G system (Release 18)," 3GPP TS 33.501 V18.5.0 (Mar. 2024).
Third Generation Partnership Project, "Technical Specification Group Services and System Aspects; Procedures for the 5G System (5GS); Stage 2 (Release 19)," 3GPP TS 23.502 V19.0.0 (Jun. 2024).
CATT, "Alignment of AS layer handling of EPS to 5GS handover with N2 handover," 3GPP TSG-SA WG3 Meeting #92bis, S3-182826, Harbin (China) (Sep. 24-28, 2018).

* cited by examiner

METHOD FOR HANDOVER KEY MANAGEMENT WITH NEXT GENERATION NETWORKS AND A SYSTEM THEREOF

BACKGROUND

Conventionally, there have been security concerns identified for fifth generation (5G) handover key management mechanisms. For example, a conventional 5G horizontal key derivation does not provide a forward security, since learning an old key enables an attacker to derive all subsequent keys. And, although a conventional 5G vertical key derivation derives a new key using an intermediate next hop (NH) parameter provided by an access and mobility management function (AMF), a source gNB knows a key (e.g. $K_{NG\text{-}RAN*}$) to be used directly by a target gNB. Until the target gNB generates a new key (e.g. $K_{NG\text{-}RAN*}$), the source gNB has knowledge of an access stratum (AS) key used by the target gNB. Therefore, the conventional 5G handover key management mechanisms can only achieve two-hops key forward secrecy. In addition, the conventional 5G handover key management mechanisms are identified to be vulnerable against de-synchronization attack and replay attack launched by a compromised gNB. Therefore, there is a need for an enhanced and secure handover key management technique for use in a next generation wireless communication network.

SUMMARY

Methods and apparatuses for handover key management are provided according to one or more embodiments disclosed herein.

In an embodiment, a base station is in communication with a wireless transmit/receive unit (WTRU) and a WTRU context management function (UCF). The base station includes a transceiver and a processor configured to receive a handover request message from the UCF via a service-based interface (SBI). The handover request message includes a security material associated with the WTRU. The transceiver and the processor are further configured to determine at least one access stratum (AS) key based on the security material. The transceiver and the processor are further configured to derive one or more control plane security keys and one or more user plane security keys based on the at least one AS key. The transceiver and the processor are further configured to establish a secure communication with the WTRU based on at least one or more control plane security keys or the one or more user plane security keys.

In an embodiment, the handover request message includes one or more of: at least one context information associated with the WTRU, at least one capabilities information associated with the WTRU, or at least one protocol data unit (PDU) session information associated with the WTRU.

In an embodiment, the handover request message further includes a UCF identifier associated with the UCF.

In an embodiment, the at least one AS key is generated based on a freshness parameter.

In an embodiment, the at least one AS key is generated further based on one or more of: a next hop chaining counter (NCC) associated with the at least one AS key, a physical cell identity associated with the base station, an absolute radio frequency downlink channel number associated with a downlink channel of the base station, or an SBI access key.

In an embodiment, the security material includes the at least one AS key.

In an embodiment, the security material includes at least one key index (ID) associated with the at least one AS key.

In an embodiment, the base station transmits, to the UCF via the SBI, a handover key retrieval request message based on the at least one key ID. The base station receives, from the UCF via the SBI, the at least one AS key in response to the handover key retrieval request message.

In an embodiment, the base station determines acceptance of the handover request message based on one or more available resources and/or one or more policies. The base station transmits, to the UCF via the SBI, a handover request acknowledgement message indicative of acceptance of the handover request message.

In an embodiment, the base station is selected by the UCF based on one or more policies in response to the handover request acknowledgement message.

In an embodiment, a WTRU includes a memory, a transceiver, and a processor. The transceiver and the processor are configured to transmit one or more measurement reports to a source base station. The one or more measurement reports include an indication of a next hop forward security capability of the WTRU. The transceiver and the processor are further configured to receive a handover command message from the source base station in response to the one or more measurement reports. The handover command message comprises at least a freshness parameter. The transceiver and the processor are further configured to generate at least one AS key based at least on the freshness parameter. The transceiver and the processor are further configured to derive one or more control plane security keys and one or more user plane security keys based on the at least one AS key. The transceiver and the processor are further configured to establish a secure communication with a target base station based on at least one of the one or more control plane security keys or the one or more user plane security keys.

In an embodiment, the handover command message further comprises one or more of: a target cell identifier associated with the target base station, a cell radio network temporary identifier, or one or more security method identifiers associated with one or more security methods of the target base station.

In an embodiment, the generation of the at least one AS key is further based on one or more of: an NCC associated with the at least one AS key, a physical cell identity associated with the target base station, an absolute radio frequency downlink channel number associated with a downlink channel of the target base station, or a service-based interface access key.

In an embodiment, the WTRU stores the at least one AS key in the memory.

In an embodiment, the handover command message is a radio resource control (RRC) reconfiguration message.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

As discussed herein, one or more abbreviations in the following (non-exhaustive) list, shown in Table 1, may be used herein.

TABLE 1

| | |
|---|---|
| 5GC | Fifth Generation (5G) Core Network |
| AAF | Authentication and Authorization Function |
| AN | Access Network |
| ARFCN | Absolute Radio-Frequency Channel Number |
| AS | Access Stratum |
| AUSF | Authentication Server Function |
| CN | Core Network |
| CP | Control Plane |
| DL | Down Link |
| HO | Handover |
| iNB | Intelligent Node B |
| nCN | Next Generation Network |
| NGAP | Next Generation Application Protocol |
| NHFS | Next Hop Forward Security |
| NR | New Radio |
| NRF | Network Repository Function |
| nUE | Next Generation UE (SBI or Distributed NAS capable UE) |
| PCI | Physical Cell Id |
| RMF | Registration and Mobility management Function |
| SBI | Service Base Interface |
| SCTP | Stream Control Transmission Protocol |

TABLE 1-continued

| | |
|---|---|
| SEAF | Security Anchor Function |
| SIB | System Information Base |
| SMC | Security Mode Command |
| UE | User Equipment |
| UCF | User Context Function/WTRU Context Management Function |
| UL | Upper Link |
| UP | User Plane |
| UPF | User Plane Function |
| WTRU | Wireless Transmit and/or Receive Unit |

Figure 1A:
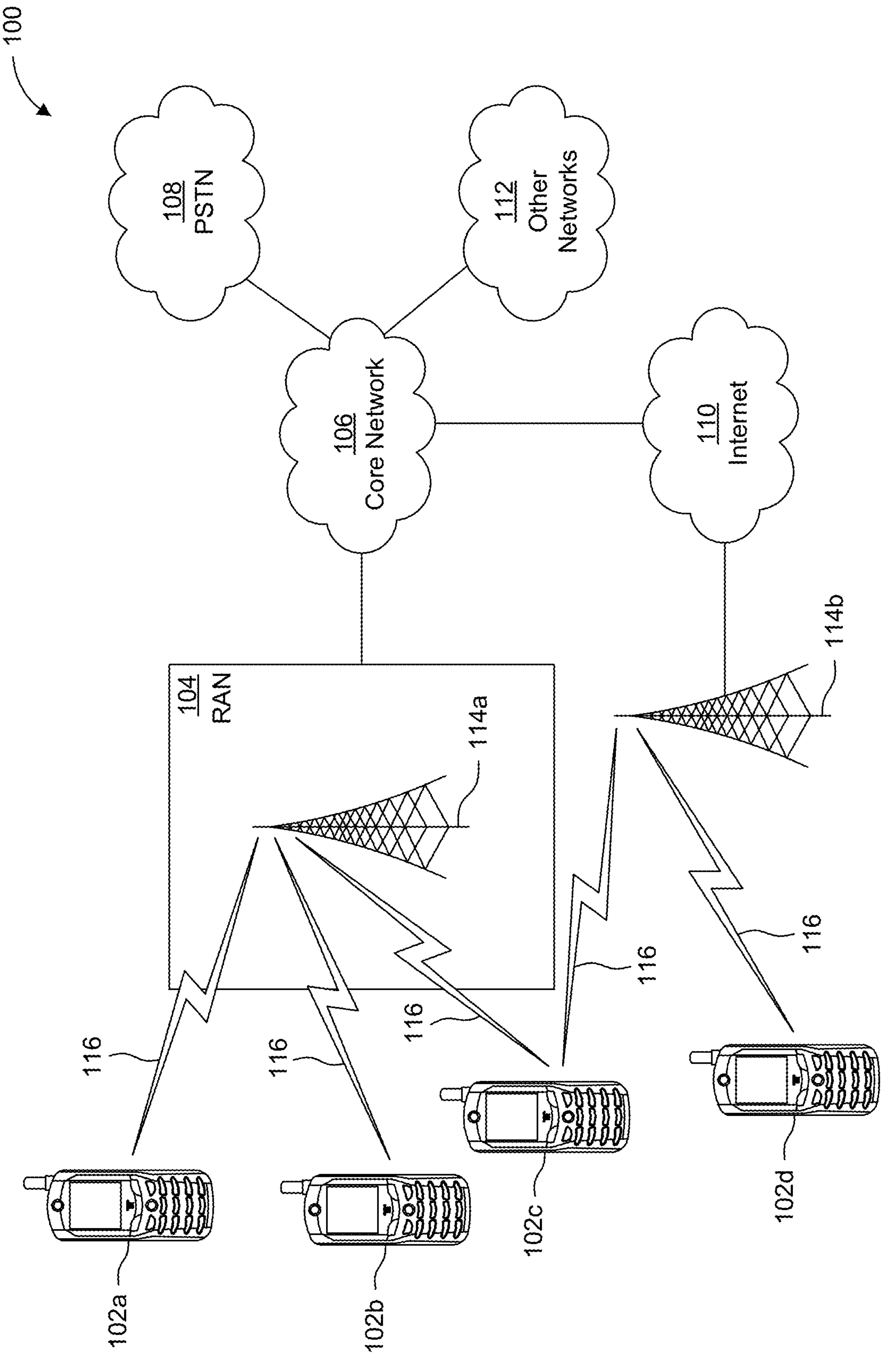
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
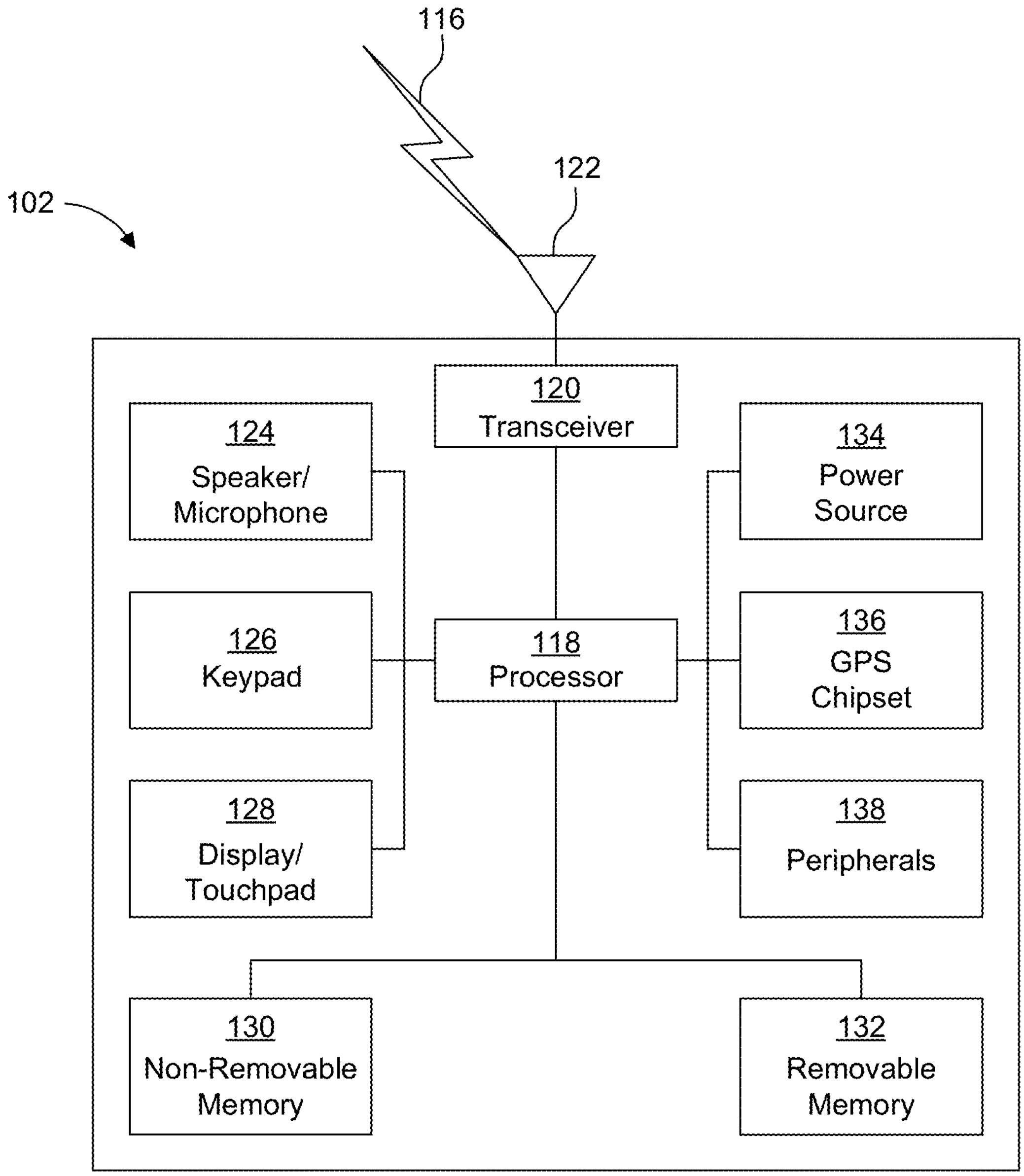
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
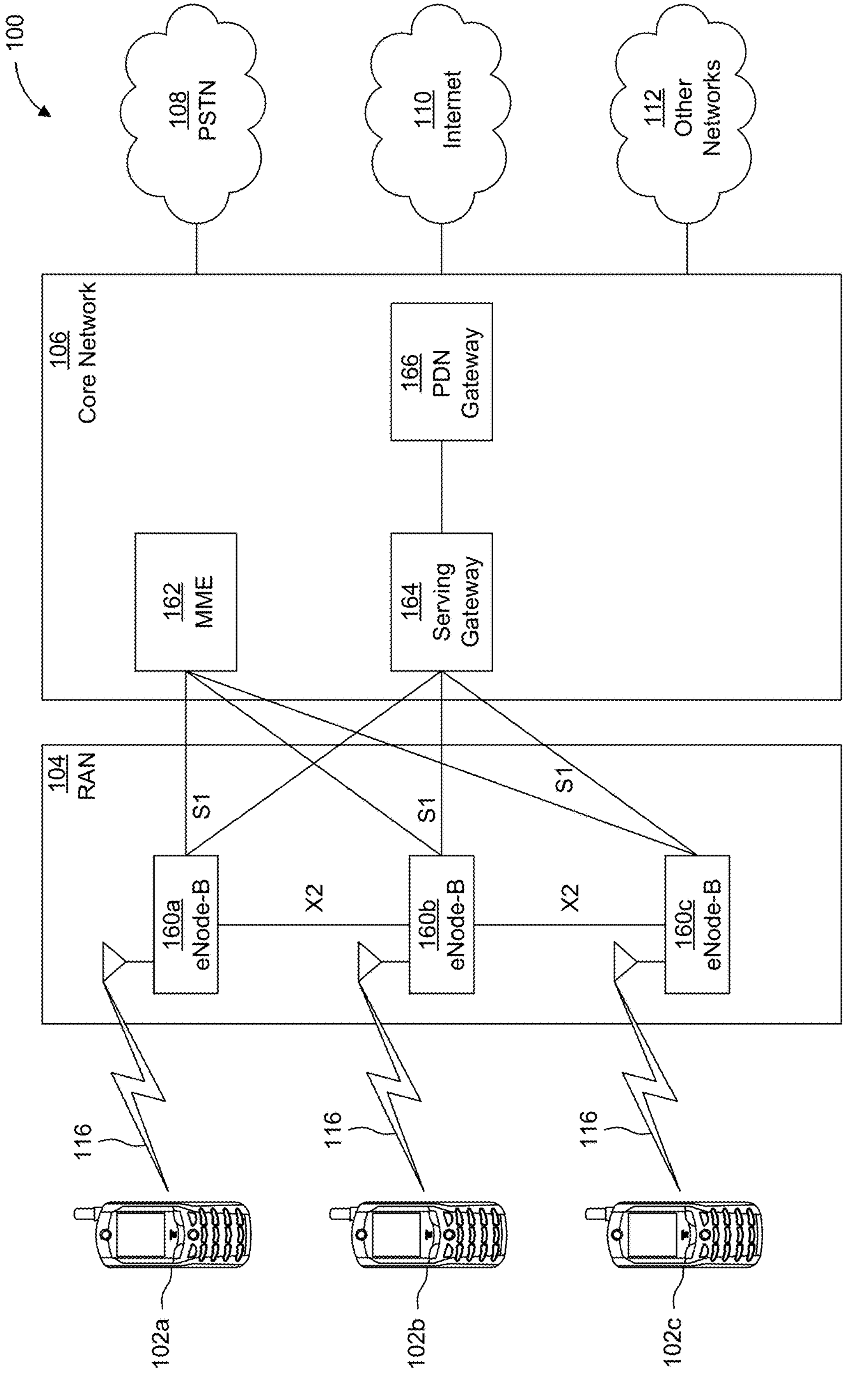
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
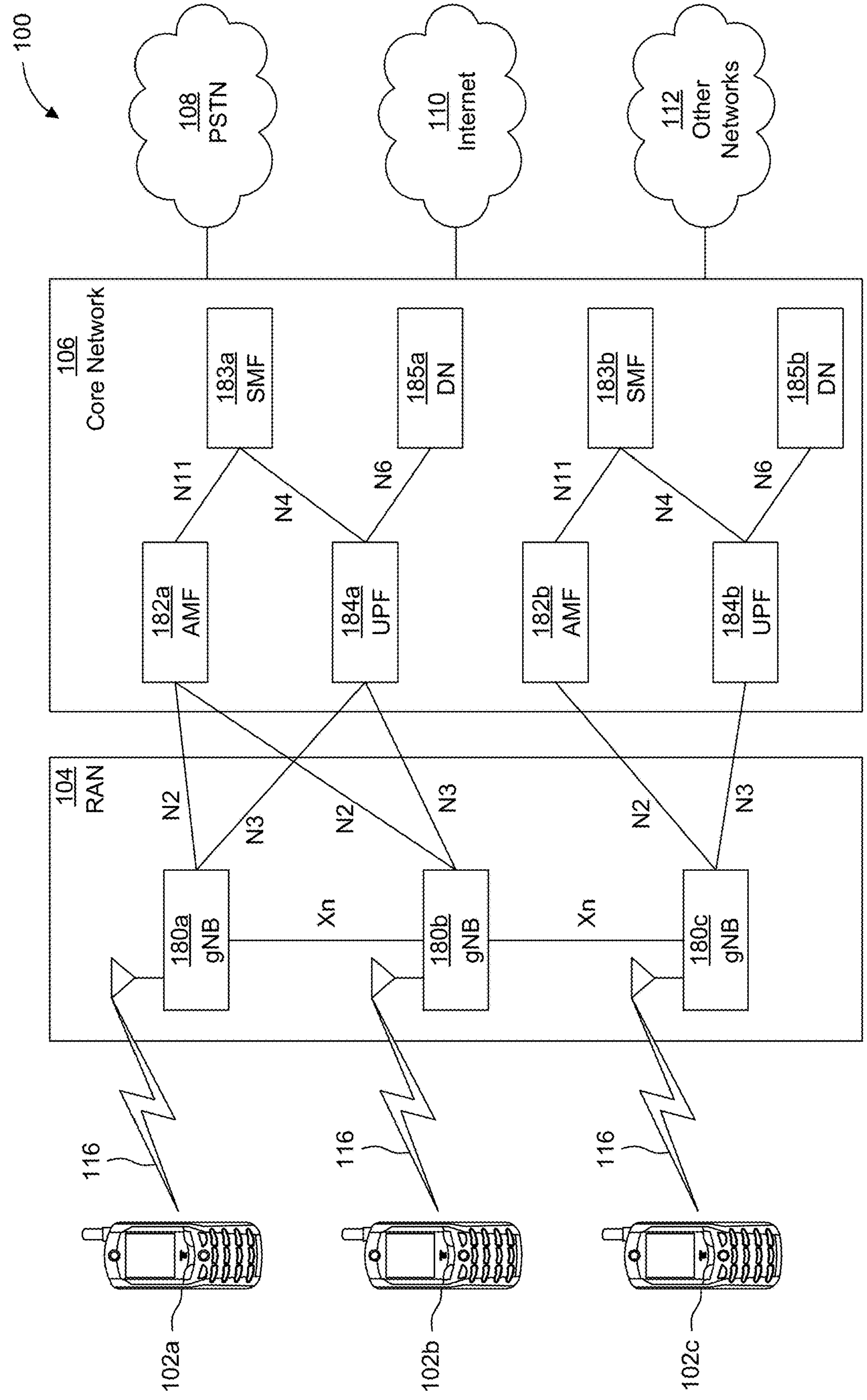
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c*, may each include one or more transceivers for communicating with the WTRUs 102*a*, 102*b*, 102*c* over the air interface 116. In one embodiment, the gNBs 180*a*, 180*b*, 180*c*, may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c*, may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In many embodiments, in a next generation wireless communication system, a WTRU context management function (UCF) (which may also be referred to as user context function (UCF) and/or UE context function (UCF) etc., for example) may function as a representative of the WTRU in the CN. The UCF may store and/or maintain information related to the WTRU such as but not limited to one or more registration and/or connection states of the WTRU, one or more locations of the WTRU, one or more security contexts of the WTRU, and/or subscription data from a unified data management (UDM) function etc., for example. The UCF may also provide a key distribution service to the RAN for an access stratum (AS) security establishment and/or for an end-to-end service base interface (SBI) message security processing. The UCF may be an independent network function (NF) or may be a part of any NF (such as the AMF, for example).

In an example, a registration and mobility management function (RMF) is the NF that may have similar functionality as the functionality found in 3GPP AMF NF, however, the RMF may focus on an enhanced registration, in addition to other functionalities, such as but not limited to an ability to process and/or generate secure service-based messages between the WTRU and the RMF etc., for example.

In an embodiment, a next generation RAN node such as but not limited to an intelligent Node B (iNB) for example, may function as an SBI gateway (and/or a distributed non-access stratum (NAS) anchor point, for example) between the WTRU and an SBI capable CN during a handover (HO) procedure described herein. A source iNB may decide to trigger the handover with a key derivation with next hop forward security (NHFS) enabled based on one or more measurement reports from an NHFS capable WTRU. The source iNB may request, from the UCF, the handover with the key derivation with NHFS providing a WTRU identifier (ID) and/or a target iNB ID. The source iNB may subscribe to the UCF for one or more notifications related to the WTRU. The source iNB may receive a handover command message confirming the handover with the key derivation with NHFS from the UCF. The handover command message may include a freshness parameter. The source iNB may transmit the handover command message including the freshness parameter to the WTRU.

In an embodiment, the target iNB may receive, from the UCF, the WTRU ID and/or one or more security parameters (e.g. a security material and/or a key material etc.) to establish the AS security with the WTRU (e.g. one or more network access key IDs and/or one or more AS keys etc.) confirming successful handover key derivation. The target iNB may receive a handover request message from the UCF. The handover request message may include but is not limited to one or more of: the WTRU ID, a UCF ID of the UCF in which the WTRU context is stored, one or more AS key IDs (one or more handover key IDs), and/or the one or more AS keys (one or more handover keys) that may be derived for establishment of a secure communication between the WTRU and the target iNB. Alternatively, the target iNB may receive the one or more AS keys (the one or more handover keys) from the UCF in the handover request message. The target iNB may authorize that the WTRU may be handed over to the target iNB. The target iNB may transmit a handover key retrieval request message to the UCF for retrieving the one or more AS keys (the one or more handover keys) using the one or more received AS key IDs (the one or more received handover key IDs). The target iNB may receive the one or more AS keys (the one or more handover keys) from the UCF in a handover key retrieval acknowledgement message. Upon deciding that the WTRU can be handed over, the target iNB may acknowledge the handover request message by transmitting a handover request acknowledgement message to the UCF. The target iNB may derive one or more user plane security keys (e.g. $K_{UP}$) and/or one or more control plane security keys (e.g. $K_{RRC}$) based on the one or more AS keys (e.g. $K_{iNB}$). The target iNB may secure the AS (i.e. a control plane (CP) and/or a user plane (UP)) communication between the WTRU and the target iNB the using one or more of the derived security keys (i.e. the one or more user plane security keys (e.g. $K_{UP}$) and/or the one or more control plane security keys (e.g. $K_{RRC}$). The target iNB may perform a security mode command (SMC) procedure with the WTRU. The target iNB may establish a secure communication with the WTRU the using one or more security keys (e.g. $K_{UP}$, $K_{RRC}$, and/or $K_{iNB}$).

In an embodiment, the WTRU may transmit, to the source iNB, an AS message (e.g. a radio resource control (RRC) message) including one or more measurement reports with an indication of NHFS enablement. The WTRU may receive, from the source iNB, an RRC message (e.g. an RRC reconfiguration message) including and/or indicative of the handover command message with the freshness parameter. The WTRU may derive the one or more AS keys in the same way as the UCF using the received freshness parameter and/or using other parameters such as but not limited to one or more of: an SBI access key (e.g. $K_{SBI}$), a physical cell ID (PCI), a next hop (NH) parameter, and/or an absolute radio frequency downlink channel number (ARFCN-DL) etc., for example. The one or more AS keys may be used to secure the communication between the WTRU and the target iNB. The WTRU may receive, from the target iNB, the RRC message and/or a security management service indication message (e.g. the SMC etc.). The WTRU may verify an integrity of the SMC. If successful, the WTRU may start integrity protection and/or deciphering DL data. The WTRU may transmit an SMC complete message to the target iNB. The WTRU may establish the communication with the target iNB using the one or more AS keys for the target iNB.

In an embodiment, the UCF may receive a handover required message indicative of a request for a handover with NHFS support to derive the one or more AS keys for the target iNB. The UCF may generate the freshness parameter and derive the one or more AS keys using one or more of: the $K_{SBI}$, the NH, the PCI of the target iNB, and/or the ARFCN-DL etc., for example. The UCF may derive the one or more AS key IDs for the generated one or more AS keys. The UCF may store the one or more AS keys and/or the one or more AS key IDs along with the target iNB ID in the WTRU security context. The UCF may transmit the handover request message including but not limited to one or more of: the one or more AS key IDs, the UCF ID, and/or the WTRU ID etc., for example, to the target iNB. In some examples, the UCF may also transmit the one or more AS keys in the handover request message. The UCF may receive the handover key retrieval request message from the target iNB. The handover key retrieval request message may include the one or more AS key IDs. The handover key retrieval request message may be indicative of a request to retrieve the one or more AS keys corresponding to the one or more AS key IDs. The one or more AS keys may be used for the communication between the WTRU and the target iNB. The UCF may respond by transmitting, to the target iNB, a handover key retrieval acknowledgement message comprising the one or more requested AS keys. The UCF may receive, from the target iNB, a handover request acknowledgement message indicative of a confirmation of an acceptance of the handover request message by the target iNB. The UCF may transmit a handover command message to the source iNB confirming the handover with the key derivation with NHFS. The handover command message includes but is not limited to the freshness parameter. Typically, if the WTRU connects via a different iNB due to one or more mobility changes, one or more radio conditions, one or more load conditions and/or any such other reasons etc. for example, one or more new AS keys may be needed for the WTRU to setup the security connection between the WTRU and the target iNB.

In an embodiment, an example next generation wireless system control plane in a next generation wireless system architecture may be provided to derive the one or more AS keys (the one or more handover keys) to handover the WTRU from the source iNB to the target iNB. The one or more AS keys (the one or more handover keys) may be securely delivered to the WTRU and/or the gNBs and/or the iNBs and/or any other such entities by way of one or more secure communication methods. In an example, the next generation wireless system architecture may also provide enhanced forward security mechanisms along with protection from various security threats (e.g. attacks) and/or prevention of such security threats.

Figure 2:
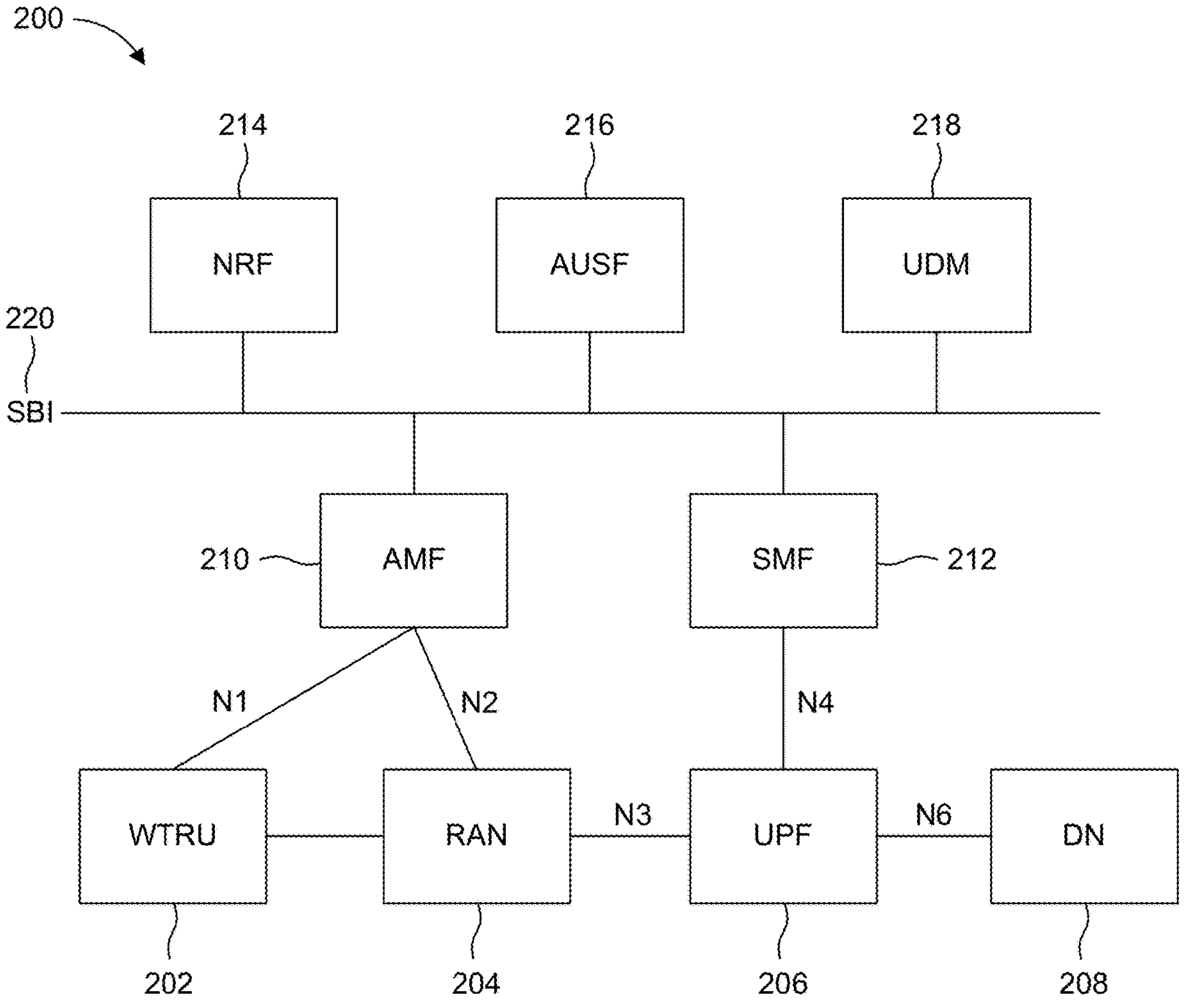
FIG. 2 illustrates an example next generation wireless system architecture.

FIG. 2 illustrates an example next generation wireless system architecture 200. The next generation wireless system architecture 200 includes a WTRU 202, a RAN 204, a UPF 206, a Data Network (DN) 208, an AMF 210, a session management function (SMF), a network repository function (NRF), an authentication server function (AUSF), and a UDM 218. The NFs (e.g. the AMF 210, the SMF 212, and/or the UDM 218 etc.) may communicate with each other using an SBI 220 (for e.g. using one or more protocols such as but not limited to hypertext transfer protocol (HTTP) etc.).

In an example, the next generation wireless system architecture 200 utilizes a Service Base Architecture (SBA). A goal of the SBA is to enable one or more NFs to expose services (e.g. using RESTful application programming interfaces (APIs) etc.) to one or more other NFs, for the next generation wireless system architecture 200 to provide a desired functionality. In some examples, the other interfaces (Nx) shown in FIG. 2 and described below may be different from the SBI 220, for example. The WTRU 202 may communicate with the AMF 210 over N1 using one or more non-AS (NAS) protocols. A control plane messaging between the WTRU 202 and one or more other NFs (e.g., the SMF 212) may be performed using an NAS transport encapsulation mechanism provided by the AMF 210 for the one or more NFs.

In an example, the RAN 204 may communicate with the AMF 210 over N2 using one or more next generation application protocols (i.e. one or more NGAP protocols). The control plane messaging between the WTRU 202 and the RAN 204 (e.g. the AS etc.) may be performed using the RRC (e.g. top of the 5G-AN protocol layers) which may be used to transport one or more NAS messages received and/or sent by the RAN 204 over N2.

Figure 3:
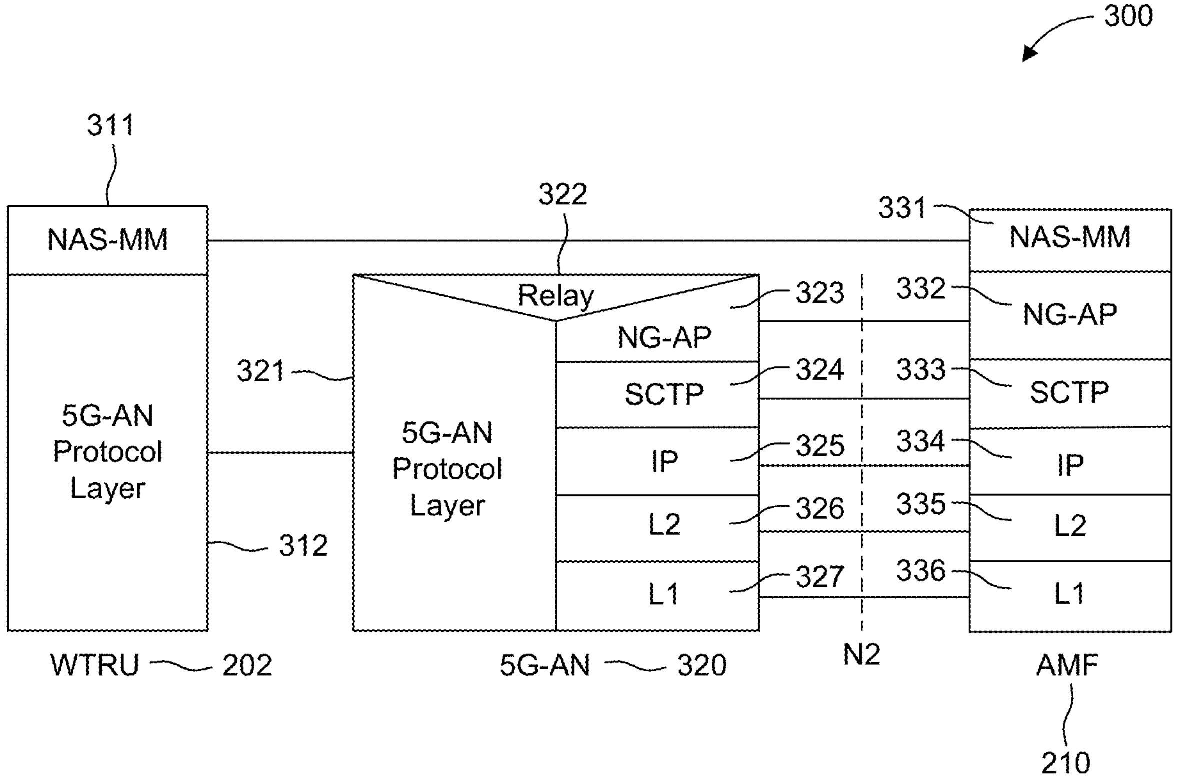
FIG. 3 illustrates an example control plane stack between a WTRU and an access and mobility management function (AMF) of FIG. 2.

FIG. 3 illustrates an example control plane stack 300 between the WTRU 202 and the AMF 210 of FIG. 2. The control plane stack 300 illustrates a plurality of protocols used for communication between the WTRU 202, a 5G AN 320, and the AMF 210. The control plane stack 300 illustrates one or more protocols and/or the functions of the next generation wireless system, such as but not limited to 5G AN protocol layer 312 and/or NAS mobility management (NAS-MM) 311 used by the WTRU 202. The 5G AN320 may use a 5G protocol layer 321, a relay 322, an NG-AP 323, a stream control transmission protocol (SCTP) 324, an internet protocol (IP) 325, one or more layer 2 (L2) protocols 326, and/or one or more layer 1 (L1) protocols 327. The AMF 210 may use a NAS-MM 331, an NG-AP 332, an SCTP 333, one or more L2 protocols 335, and/or one or more L1 protocols 336.

Figure 4:
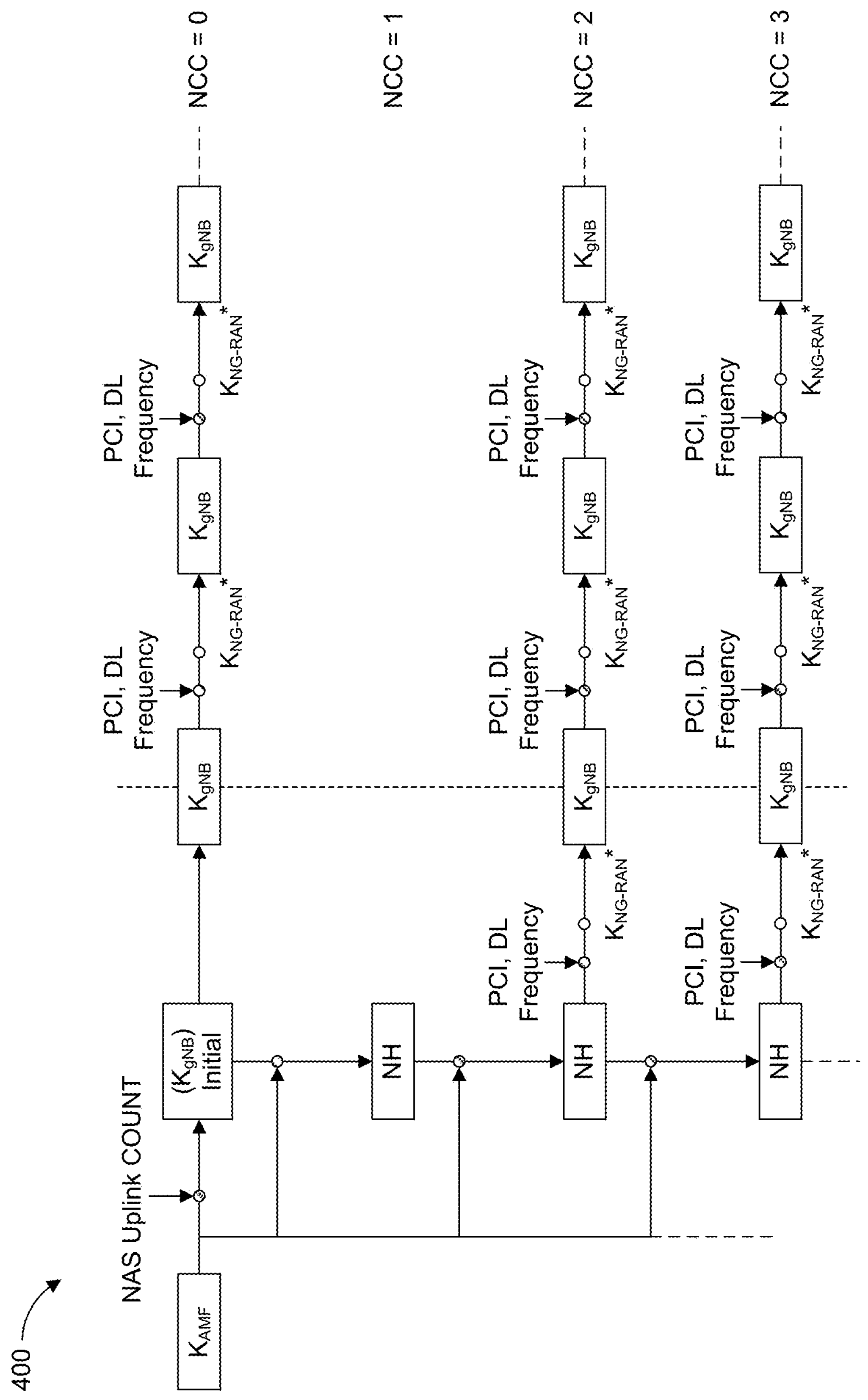
FIG. 4 illustrates an example handover key chaining process.

FIG. 4 illustrates an example handover key chaining process 400. In an example, 5G defines two mandatory primary authentication methods, viz. extensible authentication protocol (EAP-AKA') and 5G AKA for one or more WTRUs and a serving network connected to the one or more WTRUs. These methods are based on an EAP framework, wherein the WTRU may function as a peer, a security anchor function (SEAF) may function as an authenticator, and/or the AUSF may function as an authentication server. Following a successful 5G primary authentication, the SEAF (which, in some examples, may be co-located with the AMF) may obtain a WTRU permanent ID (e.g. SUPI) and/or an anchor key (e.g. $K_{SEAF}$) from the AUSF which may be used to further derive one or more security contexts, such as but not limited to the NAS security context (e.g. $K_{AMF}$) and/or the AS security context (e.g. $K_{gNB}$) on both, a WTRU side and a network side. The handover key chaining for the one or more AS keys used to secure the WTRU and a target gNB communication is illustrated in FIG. 4.

Whenever an initial AS security context needs to be established between the WTRU and/or the gNB and/or an ng-eNB, the AMF and the WTRU may derive the $K_{gNB}$ and a next hop (NH) parameter. The $K_{gNB}$ and the NH parameter may be derived from the $K_{AMF}$. An NH chaining counter (NCC) may be associated with each $K_{gNB}$ and NH parameter. Each $K_{gNB}$ may be associated with the NCC corresponding to the NH value from which the corresponding $K_{gNB}$ is derived. At an initial setup, the $K_{gNB}$ may be derived directly from $K_{AMF}$, and may be considered to be associated with a virtual NH parameter with NCC value equal to zero (i.e. NCC=0). At the initial setup, the derived NH value may be associated with the NCC value equal to one (i.e. NCC=1). The WTRU and/or the gNB and/or the ng-eNB may use the $K_{gNB}$ to secure the communication between each other. On one or more handovers and at one or more transitions from RRC_INACTIVE to RRC_CONNECTED states, the $K_{gNB}$ may be derived from a currently active $K_{gNB}$ and/or from the NH parameter. After the one or more AS keys (the one or more handover keys) are in place at both, the WTRU side and the target gNB side, the WTRU and/or the target gNB may start a procedure to protect the uplink communication and/or the downlink communication using the one or more AS keys (the one or more handover keys) as illustrated in FIG. 5 below.

Figure 5:
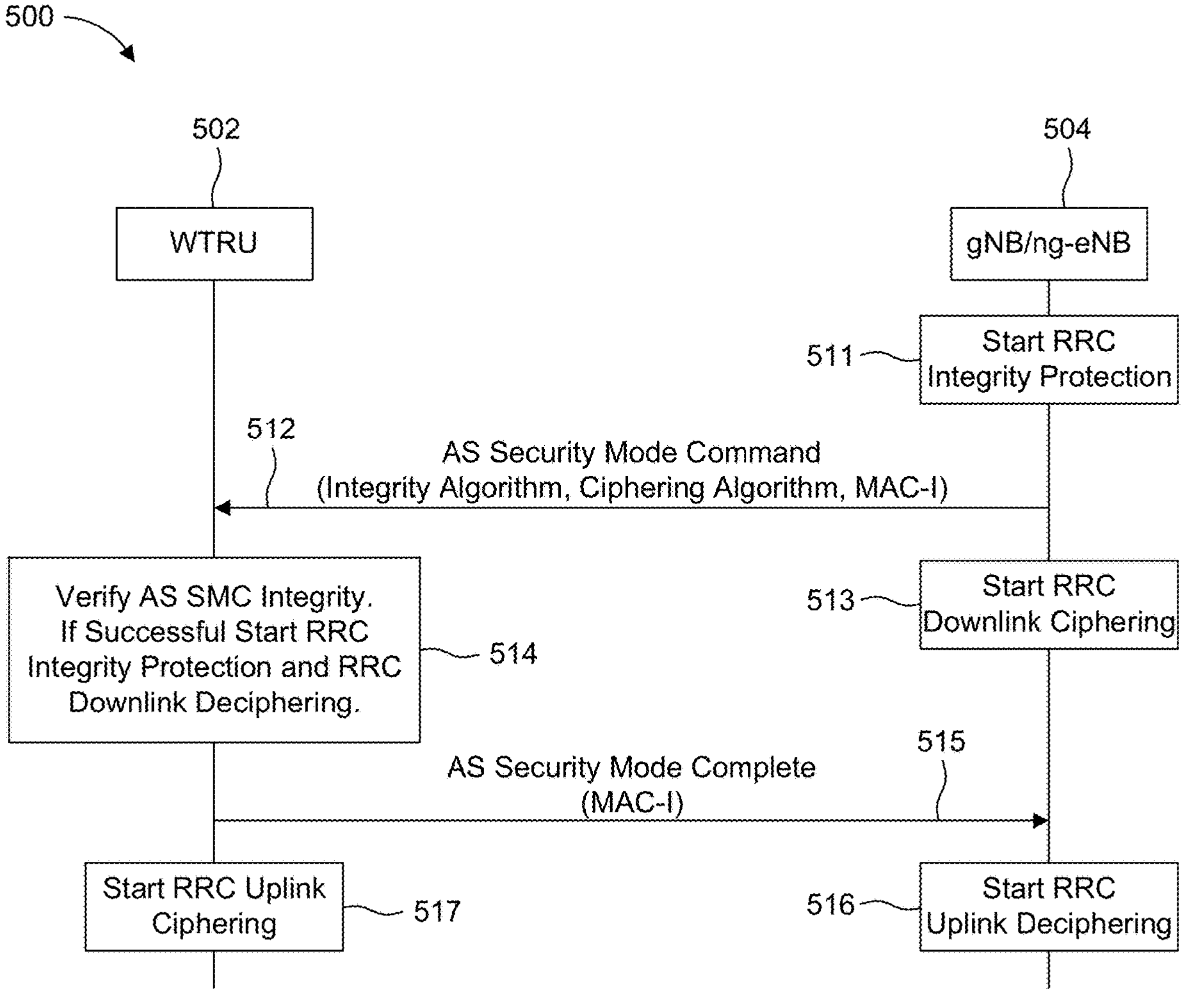
FIG. 5 is an example method of negotiation and communication protection using one or more security keys.

FIG. 5 is an example method 500 of negotiation and AS communication protection using one or more security keys. The method 500 may be performed by and/or between a WTRU 502 and/or a base station (e.g. gNB and/or ng-eNB etc.) 504. At 511, the base station 504 may initiate RRC integrity protection. At 512, the base station 504 may transmit an AS security mode command (AS SMC) to the WTRU 502. The security mode command may be indicative of one or more integrity methods, one or more ciphering (e.g. encryption and/or decryption) methods, and/or MAC-I etc.). At 513, the base station 504 may start ciphering an RRC downlink communication. At 514, the WTRU 502 may verify an integrity associated with the AS SMC. If the WTRU 502 successfully verifies the integrity, the WTRU 502 may start and/or establish an RRC integrity protection. The WTRU 502 may start deciphering the RRC downlink communication. At 515, the WTRU 502 may transmit an AS security mode complete command to the base station 504. At 516, the base station 504 may start deciphering an RRC uplink communication. At 517, the WTRU 502 may start ciphering the RRC uplink communication.

Figure 6:
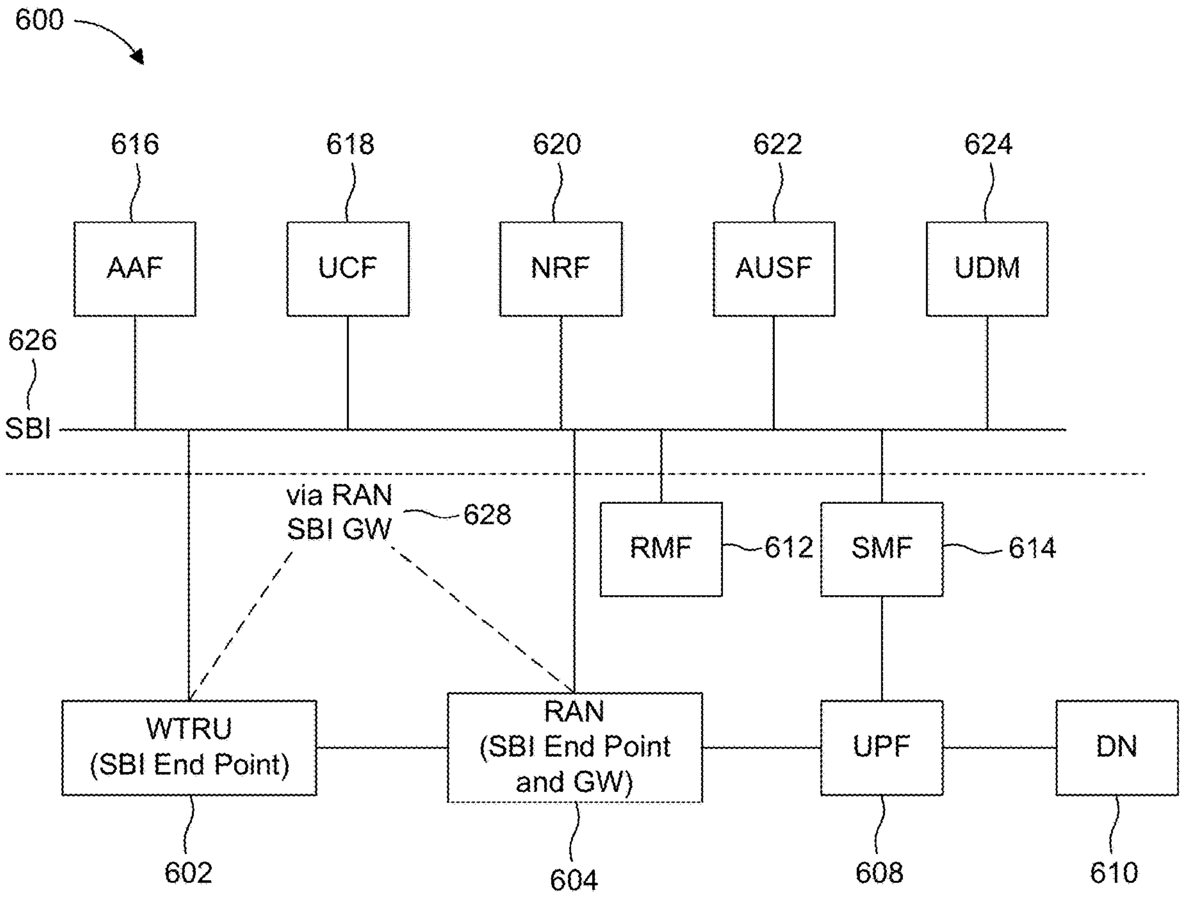
FIG. 6 illustrates a next generation wireless system architecture.

FIG. 6 illustrates a next generation wireless system architecture 600 with a RAN 604 as an SBI RAN gateway (GW) 628 according to an embodiment. The next generation wireless system architecture 600 includes a WTRU 602, the RAN 604, the UPF 608, the DN 610, the RMF 612, the SMF 614, an authentication and authorization function and/or service (AAF) 616, a WTRU (e.g. a user device, a user equipment, and/or a user etc.) context management function and/or service (UCF) 618, the NRF 620, the AUSF 622, and the UDM 624. The RAN 604 may be a base station and/or an intelligent NodeB (iNB), for example. The NFs (e.g. the AAF 616, the UCF 618, the NRF 620, the AUSF 622, and/or the UDM 624 etc.) may communicate with each other using an SBI 626. The WTRU 602 and the RAN 604 may support transmitting and/or receiving one or more SBI messages (e.g. over the air etc.). The RAN 604 may invoke one or more services according to a procedure performed with the WTRU 602.

For example, the RAN 604 may invoke the AAF 616 when any WTRU, such as the WTRU 602 requests an initial access. The AAF 616 may act as a generic authenticator (e.g. in an EAP framework) that may provide different types of authentications (e.g. primary and/or secondary authentications) towards different authentication servers (e.g. the AUSF 622 and/or a third-party AAA). The AAF 616 may be invoked and/or reused in different procedures by different NFs, for example in a primary authentication (e.g. by the RAN 604), in a PDU session secondary authentication (e.g. by the SMF 614), in a slice, or in a user identity specific authentication (e.g. by the RMF 612).

Once the WTRU 602 is successfully identified and/or authenticated, the RAN 604 may invoke one or more services of the UCF 618. The UCF 618 may act as a representative of the WTRU 602 in the nCN. As such, the UCF 618 may store and/or maintain stateful information related to the WTRU 602, such as but not limited to one or more of: one or more registration and/or connection states, a location, a security context (e.g. a key material and/or a security material for an SBI level security and/or an AS security), subscription data from the UDM 624, and/or session management information (e.g. one or more PDU session contexts). That is, the UCF 618 may provide the WTRU context as a service to the other NFs in the nCN. Unlike the WTRU context in the AMF, the UCF 618 may store, maintain and/or centralize all information related to the WTRU to allow operations from the other NFs and/or services to remain as stateless as possible for better scalability and simplicity. As the holder of security keys (e.g. an nCN security association with the WTRU), the UCF 618 may also provide a WTRU security as a service, which may include a key distribution service to the RAN 604 for the AS security establishment and/or end-to-end SBI message security processing (e.g. between the WTRU 602 and the nCN), such that the NFs may invoke the UCF 618 to process and/or protect one or more end-to-end SBI messages received and/or sent from and/or to the WTRU 602 respectively.

The RAN 604 may invoke one or more services of the RMF 612 for access control and/or mobility updates of the WTRU 602. The RMF 612 may rely on another NF, the UCF 618, for stateful information maintenance. No tightly coupled connection may exist between the RAN 604 and the RMF 612 (unlike the gNB with the AMF). Therefore, any available RMF instance may be selected (e.g. following discovery using the NRF 620) and/or invoked by the RAN 604 to handle a WTRU access control and/or mobility update logic. The RMF 612 is one of the components of the disaggregated functionality that stems from the conventional AMF. As such, the RMF 612 is responsible for a subset of the functionality of the AMF (e.g. registration, network and/or slice access control) with new types of interactions with the RAN 604 and/or new interactions with the UCF 618. As other functions, such as the AAF 616, the RMF 612 may process an end-to-end SBI message from the WTRU 602 forwarded by the RAN 604. The RMF 612 may be a stateless function (unlike the AMF) that does not maintain a WTRU state (e.g. the registration and/or connection states) and may be loosely coupled with the RAN 604 using one or more SBI based interactions (e.g. instead of a persistent SCTP connection). The RMF 612 may interact with the service provided by the UCF 618 for a WTRU context management. As such, any available RMF 612 may be selected by the RAN 604 (e.g. based on a load level) for handling initial and subsequent mobility and/or registration updates and/or messages from the WTRU 602, which may also eliminate a need to transfer the contexts between NFs (as may be the case with AMFs).

The RAN 604 may invoke the SMF 614 for a session management service. The SMF 614 may be an evolved version of the 5G SMF to support direct interaction with the RAN 604 for actions such as user plane resource allocation and/or AN-CN tunnel establishment. Direct communication between the RAN 604 and the SMF 614 may allow for a reduction of an SBI overhead due to messaging with intermediate NF (e.g. the AMF) compared to 5G. This may also allow for the RAN 604 to provide access to one or more network resources (e.g. a slice and/or one or more PDU sessions) without an issue of potential congestion at the AMF preventing such access in the case of 5G. Furthermore, the SMF 614 (or other functions such as the NEF) using an evolved SBI, may enable the transport of data over the SBI. For example, the data carried in an SBI message container may be sent to an nCN SBI endpoint (e.g. to an internal UPF within the SMF itself and/or a NEF) that then forwards the data to a destination.

A 5G handover key management according to a key hierarchy for a vertical key derivation (e.g. shown in (1) and/or a horizontal key derivation (e.g. shown in (2) is described as:

$$K_{NG\text{-}RAN}{*}=KDF(NH\|PCI\|ARFCN\text{-}DL) \tag{1}$$

$$K_{NG\text{-}RAN}{*}=KDF(K_{gNB}\|PCI\|ARFCN\text{-}DL) \tag{2}$$

The NH is calculated by (3) for first NH calculation and (4) for the remaining NH calculation:

$$NH=KDF(K_{AMF}\|K_{gNB}) \tag{3}$$

$$NH^{*}=KDF(K_{AMF}\|NH) \tag{4}$$

The 5G horizontal key derivation for the target gNB as in (2) is based on one or more keys used in the source gNB and it is derived by the source gNB and delivered to the target gNB that may use it to protect the communication between the WTRU and the target gNB.

In the case of the 5G vertical key derivation, the source gNB uses an intermediate NH parameter provided by the AMF.

Figure 7:
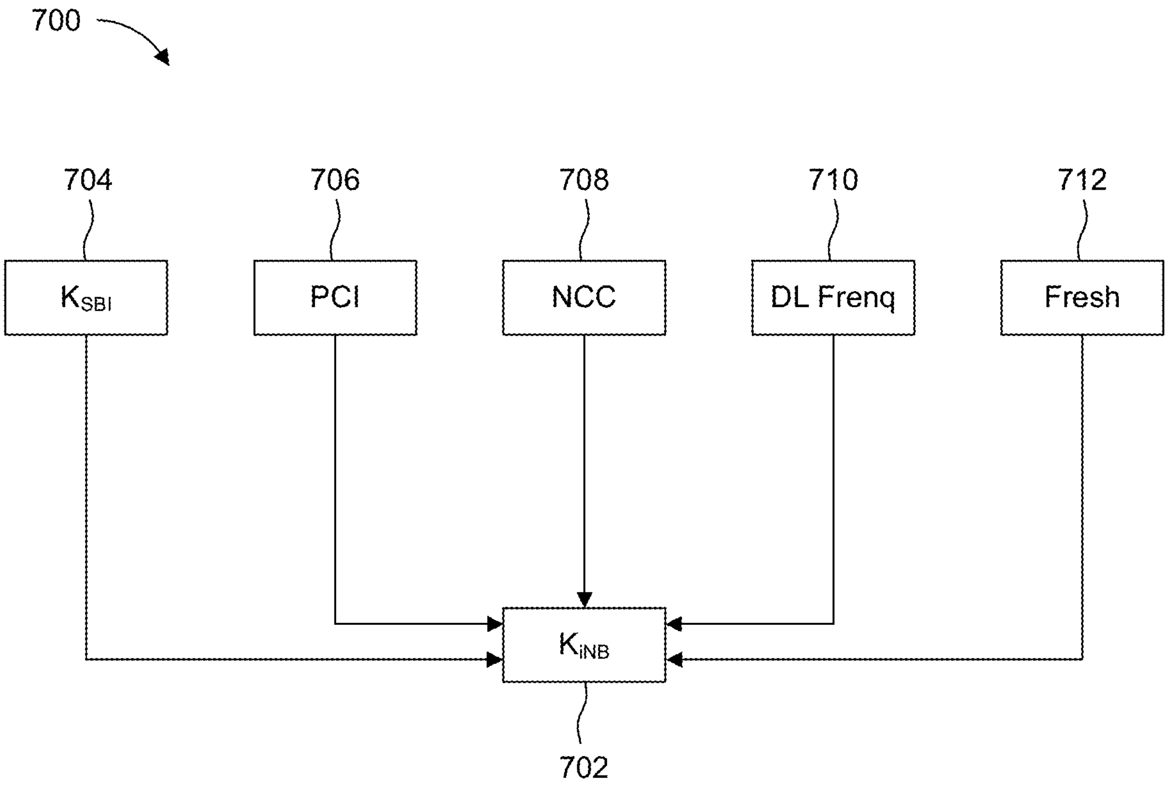
FIG. 7 illustrates an example handover key derivation process according to one or more embodiments disclosed herein.

FIG. 7 illustrates an example handover key derivation process 700 according to an embodiment. In many examples, one or more systems and/or one or more mechanisms may allow the source next generation NB (e.g. ngNB and/or iNB), intelligent-NB (e.g. nNB) etc. and the NF (e.g., the UCF and/or CF etc.) to derive one or more AS layer security keys to be used between the WTRU and the target iNB during the handover. In an example, the one or more systems and/or one or more mechanisms may facilitate derivation of the one or more AS layer security keys (e.g. for CP and/or UP layer security) between the WTRU and a next generation RAN node. Hereinafter, the terms the next generation RAN node, a next generation NB, and/or an intelligent NB may be used interchangeably. The one or more systems and/or the one or more mechanisms may also facilitate requesting and/or delivering the one or more AS layer security keys (e.g. the one or more handover keys) to the target iNB. The one or more systems and/or the one or more mechanisms may be based on a next generation CN architecture. In an embodiment illustrated in FIG. 7, a $K_{iNB}$ 702 may be derived using one or more parameters, such as but not limited to one or more of: a $K_{SBI}$ 704, a PCI 706, an NCC 708, a DL frequency number 710, and/or a freshness parameter (shown as 'fresh' in FIG. 7) 712 etc., for example.

When an AS security context needs to be established between the WTRU and the iNB, the UCF and the WTRU may derive the one or more handover keys (e.g. $K_{iNB}$ 702). The $K_{iNB}$ 702 may be derived from the $K_{SBI}$ 704 from the WTRU side and/or the UCF side, for example. There may be a distinction between a first $K_{iNB}$ 702 at an AS security setup and a following key $K_{iNB}$ 702 derivation thereafter. In that, the first $K_{iNB}$ 702 may be simply be derived from $K_{SBI}$ 704 and the NCC value 708 may be equal to zero (i.e. NCC=0). An incremented NCC may be associated with each following $K_{iNB}$ 702. The UCF and/or the WTRU may initialize the NCC value 708 to zero (i.e. NCC=0) after receiving an initial context setup request message. The WTRU and/or the iNB may use the $K_{iNB}$ 702 to secure the communication between the WTRU and the iNB. During one or more handovers and/or at one or more transitions between the RRC_INACTIVE and RRC_CONNECTED states, the $K_{iNB}$ 702 that may be used between the WTRU and the target iNB may be derived by the WTRU and the UCF, as a part of a security mode establishment. Before any measurement report may be sent to the source iNB, a security procedure between the WTRU and the UCF may be performed. During the one or more handovers, the derivation of the $K_{iNB}$ 702 may utilize a target PCI 706 and/or a corresponding frequency ARFCN-DL 710 and/or a freshness parameter 712. The freshness parameter 712 may be generated by the UCF and sent to the WTRU in the handover command message, as part of a security mode re-establishment. In an example, the UCF may generate and transmit the handover command message including the freshness parameter 712 to the source iNB, and the source iNB may transmit the handover command message including the freshness parameter 712 to the WTRU. In an example, the freshness parameter 712 may be a random number generated by the UCF. In an example, the freshness parameter 712 may be different for each handover instance and/or each initial setup instance. In an example, the freshness parameter 712 may be different for different target iNBs. In an example, the freshness parameter 712 may be different for different WTRUs that require handover. In an example, one or more freshness parameters generated by different UCFs may be different. In an example, the freshness parameter may be unique. In many examples, the freshness parameter 712 may be re-generated to provide security and/or protection from any malicious attacks. In many examples, the freshness parameter 712 may be dynamically and/or periodically regenerated to provide enhanced AS security. In many examples, the regeneration of the freshness parameter 712 and/or generation of a new freshness parameter 712 may be associated with regeneration of the one or more AS keys and/or generation of the one or more new AS keys.

When the handover starts, the one or more new AS keys may be requested from the UCF. The one or more new AS keys may be derived using one or more parameters, such as but not limited to one or more of: the $K_{SBI}$ 704 that is stored in the UCF, the freshness parameter 712 generated by the UCF, and/or other parameters:

$$K_{iNB} = KDF\left(K_{SBI} \| PCI \| ARFCN\text{-}DL \| \text{Freshness Parameter} \| NCC\right) \quad (5)$$

The UCF ID, the one or more AS key IDs, and/or the one or more AS keys may be delivered to the target iNB in the handover request message. The target iNB may retrieve the one or more AS keys directly from the UCF using the received one or more AS key IDs if the one or more AS keys are not included in the handover request message transmitted to the target iNB.

The freshness parameter 712 may be delivered to the source iNB in the handover command message and the source iNB may forward the freshness parameter 712 to the WTRU. Upon receiving the handover command message that includes the freshness parameter 712, the WTRU (e.g. the nUE) may derive the one or more AS keys in the same way as the UCF using the one or more parameters as shown above. When the one or more AS keys are ready on both the WTRU (e.g. the nUE) and the target iNB, the WTRU (e.g. the nUE) may initiate an access procedure (e.g. a random access (RACH) procedure) to the target iNB and subsequent communication between the WTRU (e.g. the nUE) and the target iNB may be protected by the one or more new AS keys and/or the one or more derived AS keys.

Figure 8A:
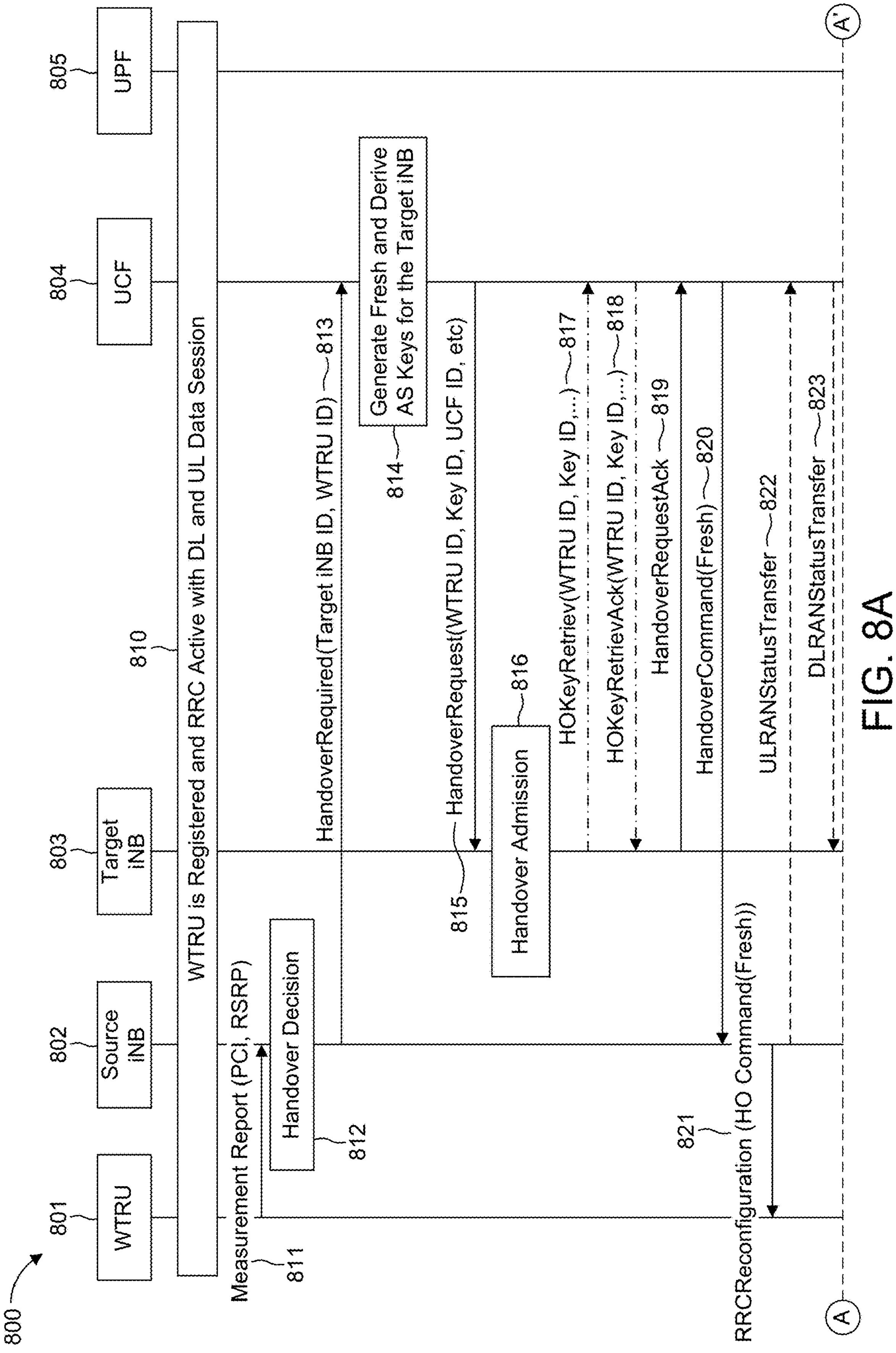
FIG. 8A and FIG. 8B illustrate an example method for a core network (CN) assisted WTRU handover according to one or more embodiments disclosed herein.
Figure 8B:
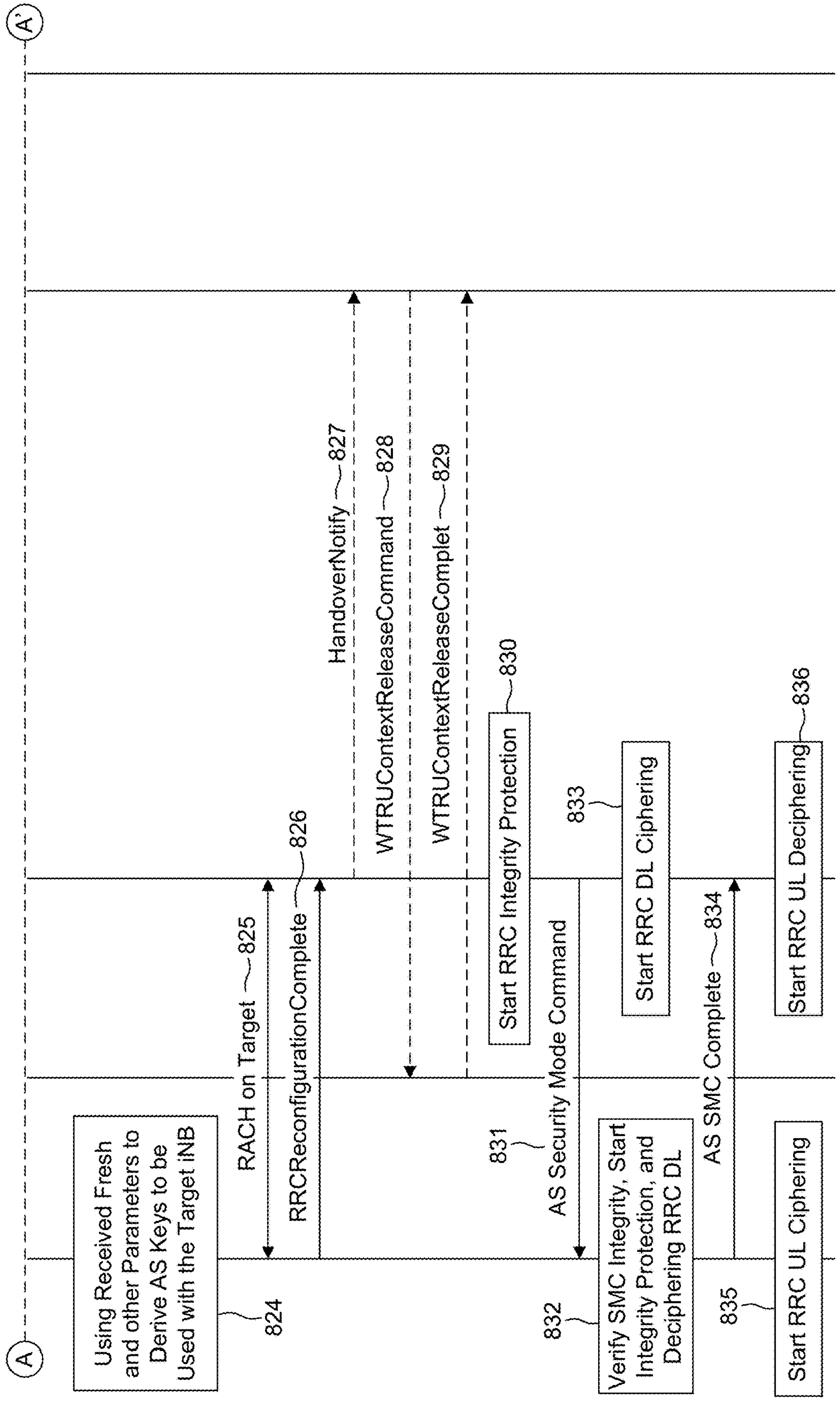

FIG. 8A and FIG. 8B illustrate an example method 800 for a CN assisted WTRU handover according to an embodiment. The method 800 may be performed by one or more of: a WTRU 801, a source iNB 802, a target iNB 803, a UCF 804, and/or a UPF 805. Initially, at 810, the WTRU 801 may be in the RRC_CONNECTED state, and the WTRU 801 may be transmitting and/or receiving uplink and/or downlink data at the source iNB 802. The WTRU 801 may be moving toward the target iNB 803, and may require the handover from the source iNB 802 to the target iNB 803. Before any measurement report may be sent to the source iNB 802, the security procedure between the WTRU 801 and the UCF 804 may be performed. In an example, one or more exchanges between the source iNB 802, the target iNB 803, and/or the UCF 804 may be via the SBI.

At 811, the WTRU 801 may transmit one or more measurement reports (e.g. via one or more measurement report messages) to the source iNB 802. In an example, the one or more measurement reports may include but are not limited to one or more PCIs and/or one or more reference signal received power (RSRP) values etc., for example. In an example, the one or more measurement reports may include but are not limited to a serving cell signal strength and/or a neighboring cell signal strength etc., for example.

At 812, based on the one or more measurement reports and/or any other information (e.g. a cell load, one or more WTRU mobility restrictions, and/or one or more radio capabilities etc.), the source iNB 802 may decide to handover the WTRU 801 to a selected target iNB e.g. the target iNB 803, and/or a list of best possible target iNBs etc., for example.

At 813, the source iNB 802 may decide to trigger the handover and may transmit the handover required message to the UCF 804. The handover required message may be sent to the UCF 804 based on the UCF ID that the source iNB 802 may obtain from the network (e.g., a serving UCF and/or other NFs etc.) during a prior registration procedure of the WTRU 801 and/or a prior handover procedure etc., for example. The handover required message may include but is not limited to one or more of: the WTRU ID, the target iNB ID, and/or a list of best possible target iNBs, one or more handover types (e.g. intra6GS, and/or 6GSto5GS etc.), one or more handover causes (e.g. handover desirable for radio reasons, etc.), and/or information about one or more protocol data unit (PDU) sessions to be handed over etc., for example. Once the UCF 804 receives the handover required message, the UCF 804 may identify the target iNB 803. The WTRU ID may be a temporary and/or long-term identifier of the WTRU 801 and the source iNB 802 may obtain the WTRU ID from the network (e.g., a serving UCF and/or any other NF etc.) during the prior registration procedure of the WTRU 801 and/or the prior handover procedures of the WTRU 801 etc., for example.

At 814, the UCF 804 may generate the freshness parameter and derive the one or more AS keys based on one or more parameters such as but not limited to one or more of: the $K_{SBI}$, the NH, the PCI of the target iNB 803, and/or the ARFCN-DL channel number that is received in 813 along with the target iNB ID (e.g. the PCI) etc., for example. The UCF 804 may derive the one or more AS key IDs associated with the one or more generated AS keys. The UCF 804 may store the one or more AS keys and/or the one or more AS key IDs along with the target iNB ID in the WTRU security context.

At 815, the UCF 804 may transmit the handover request message including the security material such as but not limited to one or more of: the WTRU security context, the WTRU capabilities, the PDU session information, a source to target transparent container, the UCF ID, and/or the one or more AS key IDs, etc. to the target iNB 803. In an example, the UCF 804 may also include the one or more AS keys to be used between the WTRU 801 and the target iNB 803 to protect the communication between the WTRU 801 and the target iNB 803 during and after the handover.

At 816, after receiving the handover request message from the UCF 804, the target iNB 803 may decide to admit the WTRU 801 or not based on one or more resources available and/or one or more policies. If accepted, the target iNB 803 may store received information about the WTRU ID and/or the UCF ID etc., for example.

At 817, the target iNB 803 may request the one or more AS keys from the UCF 804 using the one or more AS key IDs if the one or more AS keys are not included in the handover request message 815. For that, the target iNB 803 may generate and transmit the handover key retrieval request message to the UCF 804.

At 818, the target iNB 803 may receive the one or more AS keys from the UCF 804. In that, the UCF 804 may generate and transmit the handover key retrieval acknowledgement message to the target iNB 803 in response to the handover key retrieval request message. The handover key retrieval acknowledgement message may include and/or may be indicative of the one or more AS keys.

At 819, if target iNB 803 is able to admit all the PDU sessions with respective data bearers, the target iNB 803 may respond to the UCF 804 with a handover request acknowledgement message in response to the handover request message. The handover request acknowledgement message may include but is not limited to one or more of: the WTRU ID, a list of admitted PDU sessions, and/or a target to source transparent container parameter etc., for example. The target iNB 803 may refuse to admit the WTRU 801 based on the one or more policies, the one or more network loads, and/or the one or more available resources etc., for example. In that case, the target iNB 803 may transmit a handover reject message to the UCF 804. The handover reject message may be indicative that the target iNB 803 does not accept (i.e. rejects) the handover request message.

At 820, the UCF 804 may select, for the handover, a final target base station from multiple candidate target base station that the UCF receives the handover request acknowledgement message based on the one or more policies, rules, and/or other selection criteria. The UCF 804 may transmit the handover command message to the source iNB 802 along with the freshness parameter to be sent to the WTRU, as part of the security mode re-establishment. The handover command message may include but is not limited to information received in 819. The source iNB 802 may transmit the handover command message to the WTRU 801 in 821. The UCF 804 may group information related to each target iNB in a container and send a container for each potential target iNB that has an acknowledgement (ACK) as in 819 if the UCF 804 has not made the selection of the target iNB for the WTRU 801 to be handover to.

At 821, the source iNB 802 may trigger the handover by sending the RRC reconfiguration message to the WTRU 801. The RRC reconfiguration message may include but is not limited to the information required to access the target cell received in 820 such as but not limited to one or more of: a target cell ID, a new cell radio network temporary identifier (e.g. C-RNTI), one or more target iNB security algorithm identifiers for one or more selected security algorithms, and/or the freshness parameter received in 820. After receiving the handover command, the WTRU 801 may leave a source base station (e.g. the source iNB 802) and initiate a connection at a target base station (e.g. the target iNB 803) to as per the handover.

At 822, after transmitting the handover command message over the air interface, the source iNB 802 may transmit an uplink RAN status transfer message to the UCF 804 including but not limited to the WTRU ID for the RAN and/or the UCF 804 and/or a RAN status transfer transparent container message. The RAN status transfer transparent container message may include but is not limited to information about one or more data radio bearers (DRBs) packet data convergence protocol (PDCP) sequence numbers (SNs) served at the source iNB 802.

At 823, the UCF 804 may transfer the received uplink RAN status transfer message information to the target iNB 803 using a downlink RAN status transfer message.

At 824, when the WTRU 801 receives the handover command message from the source iNB 802, the WTRU 801 may derive the one or more AS keys using the freshness parameter and/or the other parameters in the same way as the UCF 804. The one or more derived AS keys may be used for establishing the secure AS communication between the WTRU 801 and the target iNB 803. In an example, the source iNB 802 may select the target iNB 803. In an example, the WTRU 801 may perform determination and/or selection of the target iNB 803 from a list of potential target iNBs.

At 825, a random access (RA) procedure may be performed at the target iNB 803, considering the received information received as a part of a RACH configuration dedicated message.

At 826, after the WTRU 801 has successfully connected to the target base station (e.g. the target iNB 803), the WTRU 801 may complete the handover procedure by transmitting an RRC reconfiguration complete message to the target iNB 803. The WTRU 801 may start an uplink data communication to the target iNB 803.

At 827, the target iNB 803 may transmit a handover notification (e.g. a handover notification message) to the UCF 804. The handover notification message may be indicative of a successful handover. The handover notification message may include but is not limited to the WTRU ID for both the RAN and the UCF 804 to identify the WTRU 801 context and/or the WTRU location information under which a tracking area (TAC) WTRU may be served.

At 828, the UCF 804 may transmit a WTRU context release message to the source iNB 802. In that, the UCF 804 may instruct the source iNB 802 to release the one or more resources related to the WTRU 801. The WTRU context release message may include but is not limited to the WTRU ID to identify the WTRU 801 context and/or a cause associated with the handover.

At 829, the source iNB 802 may transmit a WTRU context release complete message upon successfully deleting the WTRU context and/or releasing the one or more resources associated with the WTRU.

At 830, both the WTRU 801 and/or the target iNB 803 may derive the one or more user plane security keys (e.g. $K_{UP}$) and/or the one or more control plane security keys ($K_{RRC}$) based on the one or more AS keys (e.g. $K_{iNB}$) to be used to secure the AS (e.g. the CP and/or the UP) communication between the WTRU 801 and the target iNB 803. The WTRU 801 may initiate the communication with the target iNB 803 using the one or more AS keys for the target iNB 803.

At 831, the target iNB 803 and/or the WTRU 801 may perform the security mode command (SMC) procedure and/or negotiate one or more security methods.

At 832, the WTRU 801 may verify an SMC integrity, start integrity protection, and start deciphering an RRC downlink communication.

At 833, the target iNB 803 may start ciphering the RRC downlink communication.

At 834, the WTRU 801 may indicate that the SMC procedure is complete.

At 835, the WTRU 801 may start ciphering an RRC uplink communication.

At 836, the target iNB 803 may start deciphering the RRC uplink communication.

Figure 9:
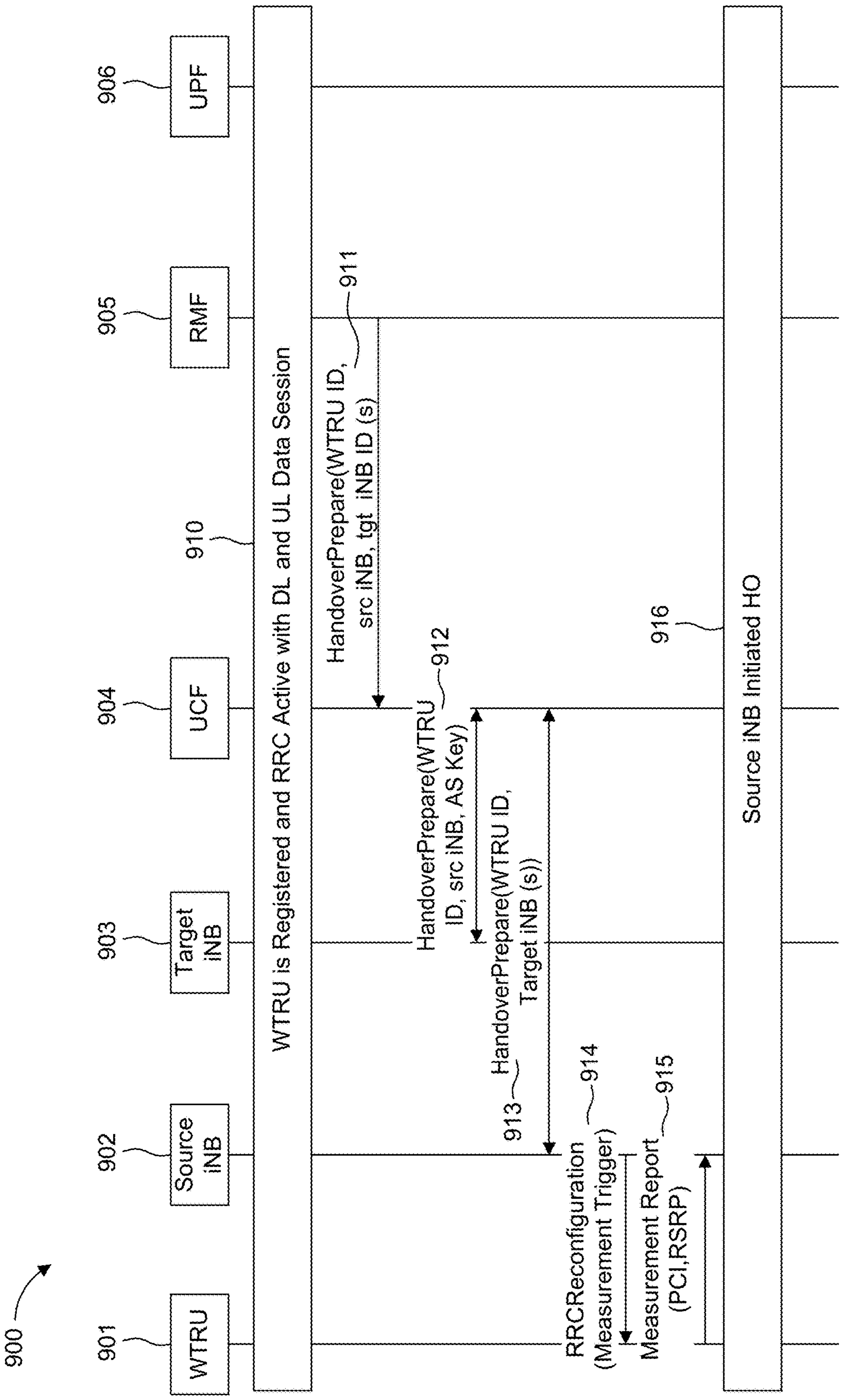
FIG. 9 illustrates an example CN triggered WTRU handover method according to one or more embodiments disclosed herein.

FIG. 9 illustrates an example CN triggered WTRU handover method 900 according to an embodiment. The method 900 may be performed by one or more of: a WTRU 901, a source iNB 902, a target iNB 903, a UCF 904, an RMF 905 and/or a UPF 906. The CN may trigger the handover instead of the source iNB 902 initiated handover. For example, the RMF 905 may use a trajectory prediction logic to request the UCF 904 to push (e.g. generate and/or transmit) a new AS key (e.g. a plurality of new AS keys and/or a plurality of new handover keys) to one or more target iNB candidates. The method 900 illustrates a flow of the CN triggered WTRU handover for any reason such as but not limited to one or more RMF predictions associated with a WTRU trajectory and/or operation maintenance etc., for example. At 910, the WTRU 901 may be in the RRC_CONNECTED state, and the WTRU 901 may be transmitting and/or receiving uplink and/or downlink data at the source iNB 902.

At 911, the RMF 905 may transmit a handover prepare message to the UCF 904 to prepare an anticipated handover (e.g., based on the WTRU trajectory prediction and/or one or more RAN load conditions etc., for example) and may provide the list of candidate target iNBs. The list may contain one or more values associated with one or more indications that the WTRU 901 may be handed over to an available target iNB of the list of candidate target iNBs.

At 912, the UCF 904 may generate the one or more AS keys for each candidate target iNB (e.g. each with corresponding freshness parameter and/or each with different freshness parameter) and provide one or more candidate target iNBs with the corresponding one or more AS keys. In an example, the UCF 904 may transmit the handover prepare message to the target iNB 903. The one or more candidate target iNBs may acknowledge to confirm readiness to be handed over the WTRU 901.

At 913, the UCF 904 may inform the source iNB 902 that the one or more candidate target iNBs are configured with the one or more AS keys and/or the security material (e.g. the key material) and are available for secure handover completion. In an example, the UCF 904 may transmit the handover prepare message to the source iNB 902.

At 914, the source iNB 902 may transmit a trigger for the WTRU 901 to perform one or more measurements. In an example, the source iNB 902 may transmit the RRC reconfiguration message to the WTRU 901 to trigger the one or more measurement reports.

At 915, the source iNB 902 may receive the one or more measurement reports from the WTRU 901. The one or more measurement reports may include and/or may be indicative of one or more reported target iNBs. The source iNB 902 may determine that at least one of a reported target iNB is on the list of the candidate target iNBs, which may be selected.

At 916, the source iNB 902 may proceed with the handover procedure indicating the selected target iNB 903 from the list of the one or more candidate target iNBs. The UCF 904 may transmit the handover command message to the source iNB 902 as described above. In an example, the UCF 904 may skip transmitting the one or more AS keys to the selected target iNB 903 when the one or more AS keys were provided to all the candidate target iNBs at 912. Thereafter, the WTRU 901 may be handed over to the target iNB 903 as described above.

In an example, the RMF 905 may query the source iNB 902 for the list of the candidate target iNBs. The RMF 905 may determine that the handover to the selected target iNB 903 is required, where the selected target iNB 903 is a candidate target iNB in the list of the candidate target iNBs. The RMF 905 may request the UCF 904 to generate the one or more freshness parameters and/or to derive the one or more AS keys for the selected target iNB 903. The UCF 904 may transmit the one or more freshness parameters, the one or more derived AS keys, and/or the WTRU ID etc., for example, to the selected target iNB 903. The target iNB 903 may transmit the handover request message to the source iNB 902, including the target to source transparent container, and indicating to the source iNB 902 that the WTRU 901 may be handed over to the target iNB 903.

Figure 10:
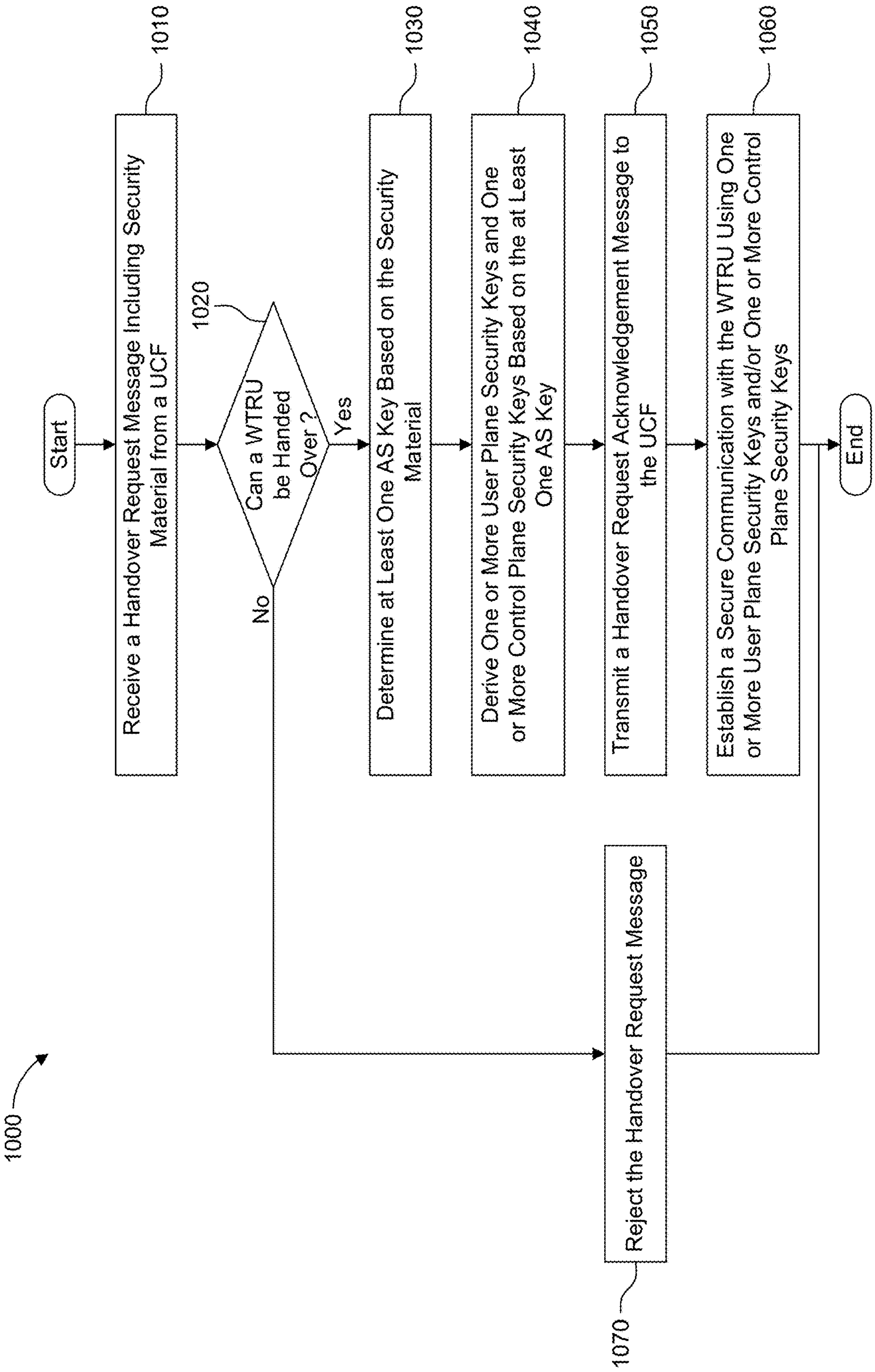
FIG. 10 illustrates a flowchart of an example process performed by a target base station according to one or more embodiments disclosed herein.

FIG. 10 illustrates a flowchart of an example process 1000 performed by a target base station according to an embodiment. The process 1000 may be performed by the target base station (e.g. the target iNB). The target base station may be in communication with the WTRU over a wireless medium. The target base station may be in communication with the UCF via the SBI. The target base station may function as the SBI endpoint and/or the SBI gateway.

At 1010, the target base station receives the handover request message from the UCF. In an example, the target base station may receive the handover request message from the UCF via the SBI. The handover request message may be indicative of a request for the handover of the WTRU to the target base station. The handover request message may include but is not limited to one or more of: the WTRU security context, the WTRU capabilities, the PDU session information, the source to target transparent container, and/or the UCF ID etc., for example. In an example, the handover request message may also include the one or more AS key IDs corresponding to the target base station. In an example, the handover request message may also include the one or more AS keys corresponding to the target base station.

At 1020, the target base station decides and/or checks, based on the one or more available resources and/or the one or more policies, whether the target base station can accept the handover request associated with the WTRU. In an example, the target base station may check, based on the one or more available resources and/or the one or more policies, whether all the PDU sessions associated with the WTRU can be serviced by the target base station.

If the target base station decides to accept the handover of the WTRU, at 1030, the target base station may determine the one or more AS keys based on the security material included in the handover request message. In that, the security material may include the one or more AS keys associated with the target base station. In an example, the security material may include the one or more AS key IDs associated with the one or more AS keys. The target base station may generate and transmit, based on the one or more AS key IDs, the handover key retrieval request message to the UCF. In response to the handover key retrieval request message, the UCF may transmit, to the target base station, the handover key retrieval acknowledgement message including the one or more AS keys corresponding to the one or more key IDs indicated by the handover key retrieval request message.

At 1040, the target base station derives the one or more UP security keys (e.g. $K_{UP}$) and/or the one or more CP security keys (e.g. $K_{RRC}$) used to secure the UP communication and/or the CP communication, respectively, between the target base station and the WTRU. In an example, the target base station may derive one or more UP security keys for encryption (e.g. $K_{UP\_ENC}$) and/or one or more UP security keys for integrity (e.g. $K_{UP\_INT}$). In an example, the target base station may derive one or more CP security keys for encryption (e.g. $K_{RRC\_ENC}$) and/or one or more CP security keys for integrity (e.g. $K_{CP\_INT}$).

At 1050, the target base station transmits the handover request acknowledgement message to the UCF. In an example, the target base station may transmit the handover request acknowledgement message to the UCF via the SBI. The handover request acknowledgement message may be indicative of the acceptance of the handover of the WTRU.

At 1060, the target base station establishes the secure communication with the WTRU. The target base station and/or the WTRU may utilize at least one of: the one or more AS keys, the one or more UP security keys, and/or the one or more CP security keys for securing the communication between the target base station and the WTRU. In an example, the WTRU may perform the RACH procedure to connect to the target base station.

If the target base station decides to not to accept, i.e. reject the handover of the WTRU, at 1070, the target base station rejects the handover request message and communicates the rejection to the UCF via the SBI.

Figure 11:
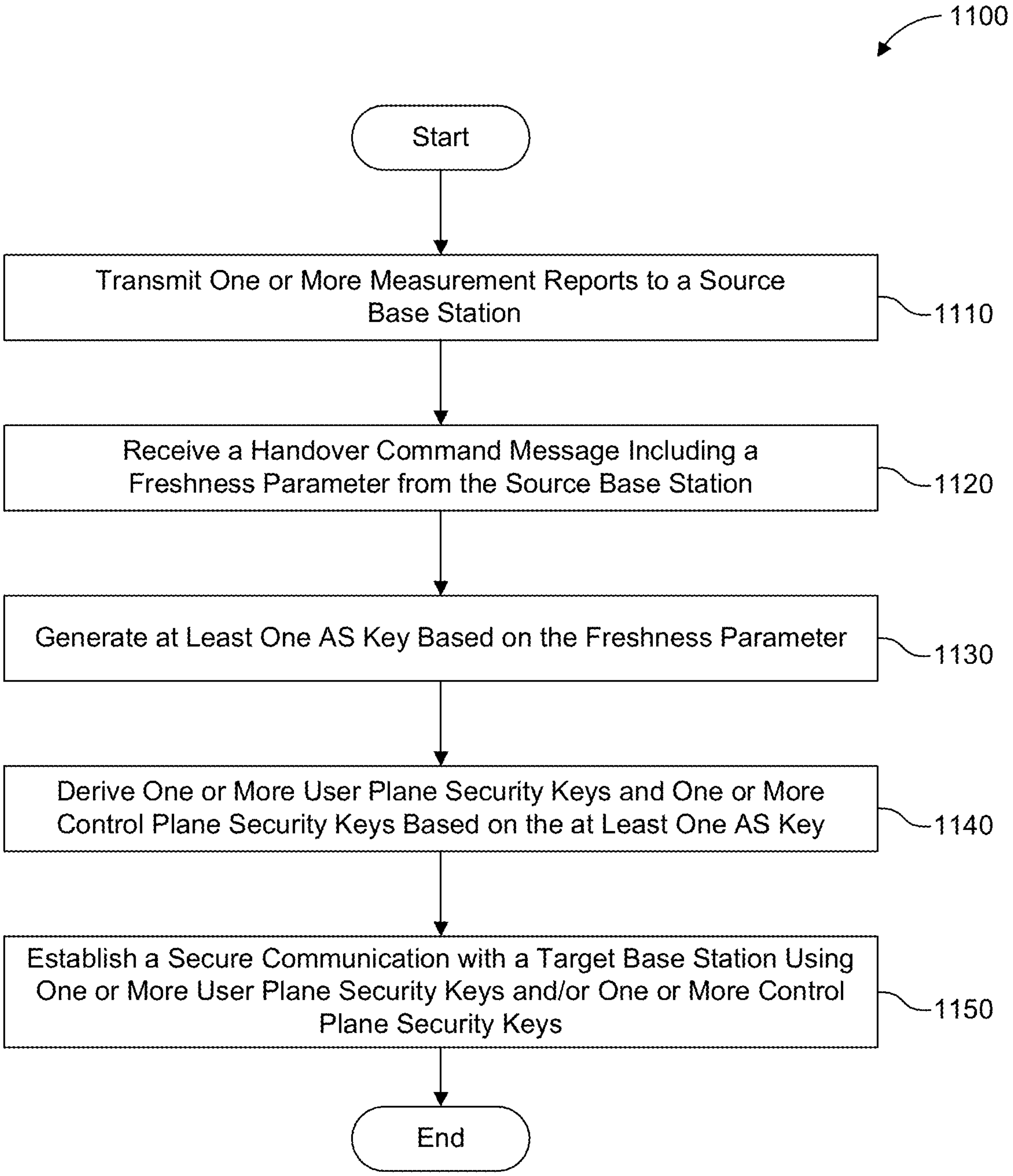
FIG. 11 illustrates a flowchart of an example process performed by a WTRU according to one or more embodiments disclosed herein.

FIG. 11 illustrates a flowchart of an example process 1100 performed by a WTRU according to an embodiment. The process 1100 may be performed by the WTRU. The WTRU may be in communication with the source base station (e.g. the source iNB) over the wireless medium. The source base station may be in communication with the UCF via the SBI. The source base station may function as the SBI endpoint and/or the SBI gateway.

At 1110, the WTRU performs the one or more measurements associated with the serving cell signal strength and/or the neighboring cell signal strength. The WTRU generates the one or more measurement reports and transmits the one or more measurement reports to the source base station. The one or more measurement reports may include an indication that the WTRU supports the NHFS enabled handover and/or is capable of performing the NHFS enabled handover.

At 1120, the WTRU receives the handover command message from the source base station. The handover command message may include one or more freshness parameters associated with one or more candidate target base stations. In an example, the WTRU may determine, based on the handover command message, the freshness parameter associated with the selected target base station.

At 1130, the WTRU generates the one or more AS keys based at least on the freshness parameter corresponding to the selected target base station. In an example the WTRU generates the one or more AS keys based on one or more of: the $K_{SBI}$, the PCI of the selected target base station, the freshness parameter corresponding to the selected target base station, the NCC value, and/or the ARFCN-DL etc., for example. In an example, the WTRU generates the one or more AS keys in the same manner as the UCF.

At 1140, the WTRU derives the one or more UP security keys and/or the one or more CP security keys. The one or more UP security keys may include but are not limited to one or more UP integrity keys and/or one or more UP encryption keys. The one or more CP security keys may include but are not limited to one or more RRC integrity keys and/or one or more RRC encryption keys. In an example, the WTRU and the target base station may derive the same one or more UP security keys and/or the same one or more CP security keys.

At 1150, the WTRU initiates the RACH procedure with the target base station to establish the secure communication with the target base station. The UP communication and/or the RRC communication may be secured by the one or more UP security keys and/or the one or more CP security keys respectively.

Figure 12:
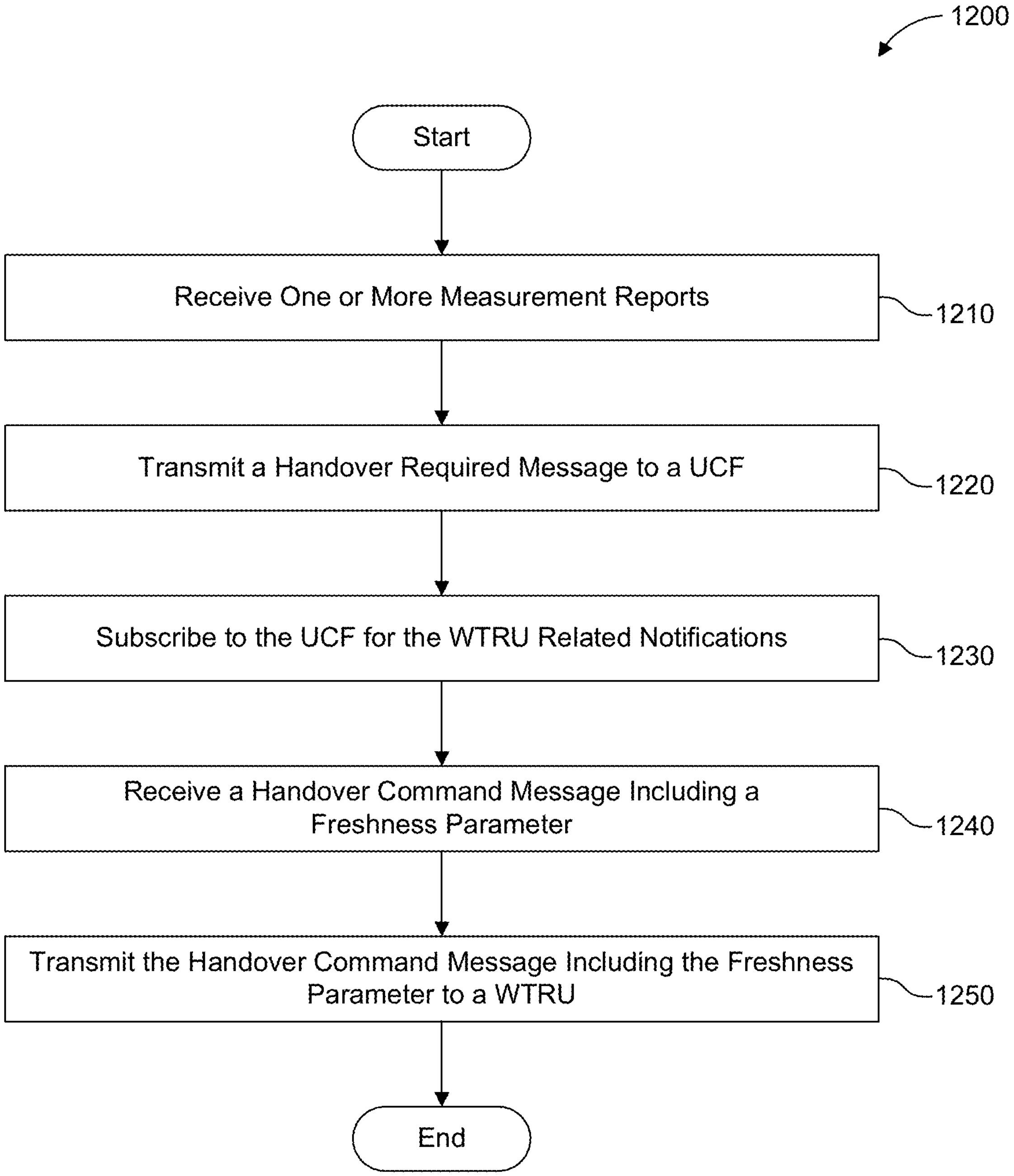
FIG. 12 illustrates a flowchart of an example process performed by a source base station according to one or more embodiments disclosed herein.

FIG. 12 illustrates a flowchart of an example process 1200 performed by a source base station according to an embodiment. The process 1200 may be performed by the source base station. The source base station may be in communication with the WTRU over the wireless medium. The source base station may be in communication with the UCF via the SBI. The source base station may function as the SBI endpoint and/or the SBI gateway.

At 1210, the source base station receives the one or more measurement reports from the WTRU. The one or more measurement reports may be indicative of the serving cell signal strength and/or the neighboring cell signal strength measured by the WTRU. The one or more measurement reports may include the indication that the WTRU supports the NHFS enabled handover and/or is capable of performing the NHFS enabled handover.

At 1220, the source base station transmits the handover required message to the UCF. In an example, the source base station may transmit the handover required message to the UCF via the SBI. In that, the source base station transmits the handover required message to the UCF associated with the UCF ID that the source base station obtains from the network (e.g. the serving UCF and/or other NF) during the prior registration procedure of the WTRU and/or the prior handover procedure of the WTRU. The handover required message may include but is not limited to one or more of: the WTRU ID, the target base station ID and/or a list of candidate target base station IDs, the handover type (e.g. the intra6GS handover, the 6GSto5GS handover, etc.), the handover cause (e.g. the handover caused by for the one or more changing radio conditions, etc.), and/or information about the one or more PDU sessions (e.g. the one or more PDU sessions associated with the WTRU) to be handed over. When the UCF receives the handover required message, the UCF may identify the target base station.

At 1230, the source base station subscribes to the UCF to receive one or more notifications associated with the WTRU. In an example, the source base station may receive the one or more notifications via the SBI.

At 1240, the source base station receives the handover command message. In an example, the source base station may receive the handover command message from the UCF via the SBI. The handover command message may include the freshness parameter generated by the UCF for the target base station and other parameters such as the PCI and/or the ARFCN-DL that are associated with selected target base station to be used by the WTRU to generate the one or more AS keys.

At 1250, the source base station transmits the handover command message to the WTRU. In that, the source base station may transmit the handover command message to the WTRU by way of the RRC reconfiguration message. The handover command message transmitted to the WTRU may include but is not limited to the freshness parameter, the PCI, and/or the ARFCN-DL associated with the target base station.

Figure 13:
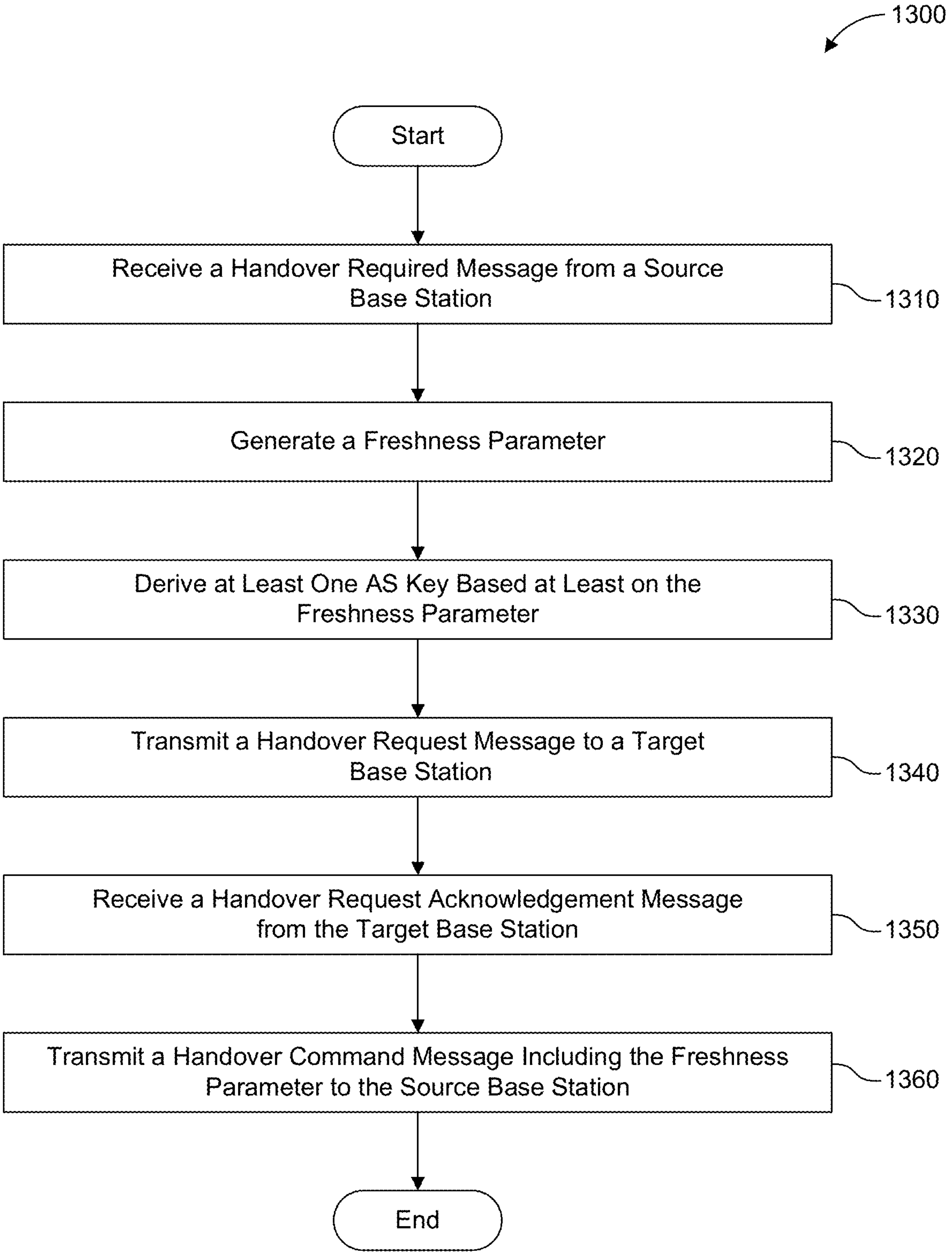
FIG. 13 illustrates a flowchart of an example process performed by a WTRU context management function (UCF) according to one or more embodiments disclosed herein.

FIG. 13 illustrates a flowchart of an example process 1300 performed by a WTRU context management function (UCF) according to an embodiment. The UCF may be in communication with the source base station and/or the target base station via the SBI.

At 1310, the UCF receives the handover required message from the source base station via the SBI. The handover required message may include but is not limited to one or more of: the WTRU ID, the target base station ID, the ARFCN-DL associated with each candidate target base station, and/or the list of candidate target base stations, the handover type, the handover cause, and/or the information about the one or more PDU sessions associated with the WTRU to be handed over to the target base station. The UCF identifies the target base station based at least on the handover required message.

At 1320, the UCF generates the freshness parameter for each candidate target base station in the list of candidate target base stations. In an example, the UCF may utilize a random number generator function to generate the freshness parameter. In an example, the freshness parameter may be the random number generated by the UCF. In an example, the freshness parameter may be different for each handover instance and/or each initial setup instance. In an example, the freshness parameter may be different for different target base stations. In an example, the freshness parameter may be different for different WTRUs that require handover. In an example, the one or more freshness parameters generated by different UCFs may be different. In an example, each freshness parameter may be unique and/or different from one or more other freshness parameters.

At 1330, the UCF derives the one or more AS keys for the one or more candidate target base stations. The UCF may derive the one or more AS keys based on one or more of: the $K_{SBI}$, the PCI of the target base station, the freshness parameter, the NCC value, and/or the ARFCN-DL etc., for example. In an example, the UCF generates the one or more AS keys in the same manner as the WTRU.

At 1340, the UCF transmits the handover request message to the target base station via the SBI. In an example, the UCF may generate and transmit one or more handover request messages to one or more candidate target base stations based on the corresponding one or more freshness parameters respectively. The handover request message may include one or more of: the one or more handover key IDs (e.g. the one or more AS key IDs), the one or more handover keys (e.g. the one or more AS keys), the UCF ID, and/or the WTRU ID etc., for example. The handover request message may also include one or more of: the security material (associated with the one or more handover and/or AS keys and/or corresponding key IDs), the WTRU security context, the WTRU capabilities, the PDU session information, and/or the source to target transparent container etc.

At 1350, the UCF receives the handover request acknowledgement message from the target base station via the SBI. In an example, the UCF may receive one or more handover request acknowledgement messages from one or more candidate target base stations that accept the handover of the WTRU. The handover request acknowledgement message may be indicative of the corresponding target base station accepting the handover request message.

At 1360, the UCF may select the final target base station for HO from all the candidate target base stations that the UCF receives the handover request acknowledgement message based on the one or more policies, rules, and/or other selection criteria and then transmits the handover command message to the source base station via the SBI. The handover command message may include but is not limited to the one or more freshness parameters associated with the one or more candidate target base stations that accept the handover request if the UCF has not made the selection of the target base station for the HO.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A base station in communication with a wireless transmit/receive unit (WTRU) and network node, the base station comprising:
- a transceiver; and
- a processor, wherein the transceiver and the processor are configured to:
- receive, from the network node via a service-based interface (SBI), a handover request message including security material associated with the WTRU,
- determine at least one access stratum (AS) key based on the security material,
- derive one or more control plane security keys and one or more user plane security keys based on the at least one AS key, and
- establish a secure communication with the WTRU based on at least one of the one or more control plane security keys or the one or more user plane security keys.

2. The base station of claim 1, wherein the handover request message includes one or more of:
- context information associated with the WTRU,
- capabilities information associated with the WTRU, or
- protocol data unit (PDU) session information associated with the WTRU.

3. The base station of claim 2, wherein the handover request message further includes a netwwork node identifier associated with the network node.

4. The base station of claim 3, wherein the at least one AS key is generated based on a freshness parameter.

5. The base station of claim 4, wherein the at least one AS key is generated further based on one or more of:
- a next hop chaining counter (NCC) associated with the at least one AS key,
- a physical cell identity associated with the base station,
- an absolute radio frequency downlink channel number associated with a downlink channel of the base station, or
- an SBI access key.

6. The base station of claim 1, wherein the security material includes the at least one AS key.

7. The base station of claim 1, wherein the security material includes at least one key index (ID) associated with the at least one AS key.

8. The base station of claim 7, wherein the transceiver and the processor are further configured to:

transmit, to the network node via the SBI, a handover key retrieval request message based on the at least one key ID, and receive, from the network node via the SBI, the at least one AS key in response to the handover key retrieval request message.

9. The base station of claim 1, wherein the transceiver and the processor are further configured to:

determine acceptance of the handover request message based on one or more available resources or one or more policies, and transmit, to the network node via the SBI, a handover request acknowledgement message indicative of acceptance of the handover request message.

10. The base station of claim 9, wherein the transceiver and the processor are further configured to:

receive, from the network node, a message indicating that the base station is selected by the network node based on one or more policies.

11. A method performed by a base station, wherein the base station is in communication with a wireless transmit/receive unit (WTRU) and a network node, the method comprising:

receiving, from the network node via a service-based interface (SBI), a handover request message including security material associated with the WTRU;

determining at least one access stratum (AS) key based on the security material;

deriving one or more control plane security keys and one or more user plane security keys based on the at least one AS key; and establishing a secure communication with the WTRU based on at least one of the one or more control plane security keys or the one or more user plane security keys.

12. The method of claim 11, wherein the handover request message includes one or more of:

a network node identifier associated with the network node, context information associated with the WTRU, capabilities information associated with the WTRU, or protocol data unit (PDU) session information associated with the WTRU.

13. The method of claim 11, wherein the at least one AS key is generated based on one or more of:

a freshness parameter, a next hop chaining counter (NCC) associated with the at least one AS key, a physical cell identity associated with the base station, an absolute radio frequency downlink channel number associated with a downlink channel of the base station, or an SBI access key.

14. The method of claim 11, wherein the security material includes the at least one AS key or at least one key index (ID) associated with the at least one AS key.

15. The method of claim 14, wherein the security material includes the at least one key ID associated with the at least one AS key, and wherein the method further comprises:

transmitting, to the network node via the SBI, a handover key retrieval request message based on the at least one key ID; and receiving, from the network node via the SBI, the at least one AS key in response to the handover key retrieval request message.

16. A wireless transmit/receive unit (WTRU) comprising:

a memory;

a transceiver; and a processor, wherein the transceiver and the processor are configured to:

transmit, to a source base station, one or more measurement reports including an indication of a next hop forward security capability, receive a handover command message from the source base station in response to the one or more measurement reports, wherein the handover command message comprises at least a freshness parameter, generate at least one access stratum (AS) key based at least on the freshness parameter, derive one or more control plane security keys and one or more user plane security keys based on the at least one AS key, and establish a secure communication with a target base station based on at least one of the one or more control plane security keys or the one or more user plane security keys.

17. The WTRU of claim 16, wherein the handover command message further comprises one or more of:

a target cell identifier associated with the target base station, a cell radio network temporary identifier, or one or more security method identifiers associated with one or more security methods of the target base station.

18. The WTRU of claim 16, wherein the generation of the at least one AS key is further based on one or more of:

a next hop chaining counter (NCC) associated with the at least one AS key, a physical cell identity associated with the target base station, an absolute radio frequency downlink channel number associated with a downlink channel of the target base station, or a service-based interface (SBI) access key.

19. The WTRU of claim 16, wherein the transceiver and the processor are further configured to store the at least one AS key in the memory.

20. The WTRU of claim 16, wherein the handover command message is a radio resource control (RRC) reconfiguration message.

* * * * *